(12) United States Patent
Higuchi et al.

(10) Patent No.: US 12,150,021 B2
(45) Date of Patent: Nov. 19, 2024

(54) GENERATING SUBGROUPS FROM A VEHICULAR MICRO CLOUD

(71) Applicant: Toyota Motor Engineering & Manufacturing North America, Inc., Plano, TX (US)

(72) Inventors: Takamasa Higuchi, Mountain View, CA (US); Seyhan Ucar, Mountain View, CA (US); Onur Altintas, Mountain View, CA (US)

( * ) Notice: Subject to any disclaimer, the term of this patent is extended or adjusted under 35 U.S.C. 154(b) by 113 days.

(21) Appl. No.: 17/364,169

(22) Filed: Jun. 30, 2021

(65) Prior Publication Data
US 2023/0007453 A1    Jan. 5, 2023

(51) Int. Cl.
*H04W 4/40*     (2018.01)
*H04L 41/14*    (2022.01)
*H04W 24/02*    (2009.01)
*H04W 24/10*    (2009.01)
*H04W 84/18*    (2009.01)

(52) U.S. Cl.
CPC ............... *H04W 4/40* (2018.02); *H04L 41/14* (2013.01); *H04W 24/02* (2013.01); *H04W 24/10* (2013.01); *H04W 84/18* (2013.01)

(58) Field of Classification Search
CPC ....... H04W 4/40; H04W 24/02; H04W 24/10; H04W 84/18; H04L 41/14
See application file for complete search history.

(56) References Cited

U.S. PATENT DOCUMENTS

| 2016/0315814 | A1  | 10/2016 | Thirumurthi et al. |
| 2019/0079540 | A1* | 3/2019  | Yoon ........................ H04L 43/08 |
| 2019/0191265 | A1* | 6/2019  | Altintas .............. H04L 43/0876 |
| 2020/0169605 | A1* | 5/2020  | Higuchi .............. H04L 67/1097 |
| 2020/0377128 | A1* | 12/2020 | Marczuk .......... G08G 1/096816 |
| 2022/0414450 | A1* | 12/2022 | Guo ........................ G06N 3/04 |
| 2023/0179969 | A1* | 6/2023  | Pateromichelakis ........ H04L 41/0894 370/329 |

FOREIGN PATENT DOCUMENTS

| CN | 109688224  | 4/2019 |
| EP | 2481217    | 8/2012 |
| WO | 2019006085 | 1/2019 |

OTHER PUBLICATIONS

Liang et al., "Graph-Based Resource Sharing in Vehicular Communication," IEEE Transactions on Wireless Communications, vol. 17, No. 7, Jul. 2018.*

(Continued)

*Primary Examiner* — Jae Y Lee
(74) *Attorney, Agent, or Firm* — Jon-Michael Burbage; Burbage Law, P.C.

(57) ABSTRACT

A method includes receiving network statistics from one or more vehicles that are members of a vehicular micro cloud. The method further includes detecting a degradation in vehicle-to-vehicle (V2V) communication performance based on the network statistics. The method further includes generating a communication graph based on the network statistics. The method further includes dividing the vehicular micro cloud into subgroups based on the communication graph.

20 Claims, 8 Drawing Sheets

(56) References Cited

OTHER PUBLICATIONS

Abanto-Leon et al. "Parallel and Successive Resource Allocation for V2V Communications in Overlapping Clusters," 2017 IEEE Vehicular Networking Conference (VNC), 2017.*
Abanto-Leon, et al., "Parallel and Successive Resource Allocation for V2V Communications in Overlapping Clusters," 2017 IEEE Vehicular Networking Conference (VNC), 2017, 18 pages.
Sun, et al., "Learning-Based Task Offloading for Vehicular Cloud Computing Systems," 2018 IEEE International Conference on Communications, 2018, 7 pages.
Gambuzza, et al., "Controlling symmetries and clustered dynamics of complex networks," IEEE Transactions on Network Science and Engineering, vol. 8, No. 1, 2021, pp. 282-293.
Abanto-Leon, et al., "Graph-based resource allocation with conflict avoidance for V2V broadcast communications," 2017 IEEE 28th Annual International Symposium on Personal, Indoor, and Mobile Radio Communications, 2017, 16 pages.
Sanchez-Iborra, et al., "Empowering the Internet of Vehicles with Multi-RAT 5G Network Slicing," Sensors 2019, vol. 19, 2019, 16 pages.
Liang, et al., "Graph-Based Radio Resource Management for Vehicular Networks," 7 pages.

* cited by examiner

GENERATING SUBGROUPS FROM A VEHICULAR MICRO CLOUD

BACKGROUND

The specification relates to generating subgroups from a vehicular micro cloud. In particular, this specification relates to detecting a degradation in vehicle-to-vehicle communication and dividing a vehicular micro cloud into subgroups to correct the degradation by using radio channels and/or wireless communication technology.

Connected vehicles form clusters of interconnected vehicles that are located at a similar geographic location and referred to as vehicular micro clouds. The cluster of connected vehicles collaboratively perform computation, data storage, communication, and sensing tasks over vehicle-to-vehicle (V2V) networks to cope with an increasing network traffic generated for and by connected vehicles. The connected vehicles collaboratively store (or cache) data sets in their onboard data storage devices and compute and share these data sets as requested by other connected vehicles in the vehicular micro cloud.

Vehicular micro clouds remove the need for the connected vehicles to access remote cloud servers or edge servers by vehicle-to-network (V2N) communications (e.g., by cellular networks) whenever they need to get access to computing resources such as shared data (e.g., high-definition road map for automated driving), shared computational power, and cloudification services. For some applications, connected vehicles may have to exchange a large amount of data (e.g., sensor data from vehicle on-board sensors) with other vehicles in the vehicular micro cloud using V2V communications. However, too much network traffic easily overloads the V2V communication channel, and in turn leads to degradation of the quality of application performance.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a method includes a server: receiving network statistics from one or more vehicles that are members of a vehicular micro cloud. The method further includes detecting a degradation in vehicle-to-vehicle (V2V) communication performance based on the network statistics. The method further includes generating a communication graph based on the network statistics. The method further includes dividing the vehicular micro cloud into subgroups based on the communication graph. Other embodiments of this aspect include corresponding computer systems, apparatus, and computer programs recorded on one or more computer storage devices, each configured to perform the actions of the methods.

Implementations may include one or more of the following features. In some embodiments, generating the communication graph includes: defining each vehicle in the vehicular micro cloud as a vertex, connecting each pair of the vertices with an edge, and associating each edge with a weight, wherein the weight indicates an amount of network traffic transmitted between a corresponding pair of vehicles in the vehicular micro cloud. In some embodiments, dividing the vehicular micro cloud into subgroups based on the communication graph includes dividing the communication graph into a number of subgraphs such that a total weight of edges across the subgraphs is minimized, wherein a number of subgroups matches the number of subgraphs. In some embodiments, a first subgroup of the subgroups uses one or more of a different wireless channel or a different wireless communication technology than a second subgroup and further comprising: receiving a communication from a first vehicle associated with the first subgroup that is intended for a second vehicle associated with the second subgroup and forwarding the communication to the second vehicle. In some embodiments, the communication is forwarded using a vehicle to cloud to vehicle communication. The method further includes responsive to communications between the first vehicle and the second vehicle meeting a threshold communication value, reassigning corresponding vehicles in the subgroups. The method further includes responsive to a wireless channel associated with the first subgroup becoming saturated, dividing the first subgroup into a third subgroup and a fourth subgroup. The method further includes transmitting instructions to the vehicles in the vehicular micro cloud to form the subgroups, wherein the instructions include assigning a corresponding vehicle to one of the subgroups and a corresponding wireless channel or corresponding wireless communication that is used for communication within the one of the subgroups. In some embodiments, the network statistics include an amount of data transmitted between each pair of vehicles in the vehicular micro cloud, the network statistics are received periodically from the one or more vehicles in the subgroups, and the method further comprises: updating the communication graph based on more recent network statistics, determining that an amount of communications between a first vehicle in a first subgroup and a second vehicle in a second subgroup meet a threshold communication value, and responsive to meeting the threshold communication value, reassigning corresponding vehicles in the subgroups. In some embodiments, the network statistics include a network condition. In some embodiments, the degradation is for one or more of channel congestion or latency.

One general aspect includes a computer program product included in at least one onboard vehicle computer, the computer program product including computer code that is operable, when executed by the onboard vehicle computer, to cause the onboard vehicle computer to execute steps including: transmitting, to a server, network statistics that describe communications between the ego vehicle and one or more remote vehicles, wherein the ego vehicle and the one or more remote vehicles are members of a vehicular micro cloud and receiving an instruction from the server for the ego vehicle to be associated with a first group, wherein the server detects a degradation in vehicle-to-vehicle (V2V) communication performance based on the network statistics and determines to divide the vehicular micro cloud into a first subgroup and a second subgroup based on a communication graph. Other embodiments of this aspect include corresponding computer systems, apparatus, and computer programs recorded on one or more computer storage devices, each configured to perform the actions of the methods.

Implementations may include one or more of the following features. The computer program product where the first subgroup uses one or more of a first wireless channel or a first wireless communication technology and wherein the first wireless channel or the first wireless communication technology is different from one or more of a second wireless channel or a second wireless communication technology used by the second subgroup. In some embodiments, the non-transitory computer code is further operable to execute steps including: generating a communication for a remote vehicle of the one or more remote vehicles, determining that the remote vehicle is associated with the second subgroup, and transmitting the communication to the server, wherein the server forwards the communication to the remote vehicle. In some embodiments, the non-transitory computer code is further operable to execute steps including: generating a communication for a remote vehicle, determining that the remote vehicle is associate with the first subgroup, and transmitting the communication to the remote vehicle uses one or more of the first wireless channel or the first wireless communication technology. Implementations of the described techniques may include hardware, a method or process, or computer software on a computer-accessible medium.

One general aspect includes a system included in a hub vehicle of a vehicular micro cloud, the system including: a processor; a non-transitory memory communicatively coupled to the processor, where the non-transitory memory stores executable code that is operable, when executed by the processor, to cause the processor to: receive network statistics from one or more vehicles that are members of a vehicular micro cloud, detect a degradation in V2V communication performance based on the network statistics, generate a communication graph based on the network statistics, and divide the vehicular micro cloud into subgroups based on the communication graph. Other embodiments of this aspect include corresponding computer systems, apparatus, and computer programs recorded on one or more computer storage devices, each configured to perform the actions of the methods.

One general aspect includes a method implemented by an ego vehicle that includes: receiving network statistics from one or more vehicles that are members of a vehicular micro cloud, detecting a degradation in vehicle-to-vehicle (V2V) communication performance based on the network statistics, generating a communication graph based on the network statistics, and dividing the vehicular micro cloud into subgroups based on the communication graph.

In some embodiments, generating the communication graph includes: defining each vehicle in the vehicular micro cloud as a vertex, connecting each pair of the vertices with an edge, and associating each edge with a weight, wherein the weight indicates an amount of network traffic transmitted between a corresponding pair of vehicles in the vehicular micro cloud. In some embodiments, dividing the vehicular micro cloud into subgroups based on the communication graph includes dividing the communication graph into a number of subgraphs such that a total weight of edges across the subgraphs is minimized, wherein a number of subgroups matches the number of subgraphs. In some embodiments, the ego vehicle is associated with a first subgroup of the subgroups that uses one or more of a different wireless channel or a different wireless communication technology than a second subgroup and further comprising: generating a communication that is intended for a remote vehicle associated with a second subgroup and forwarding the communication to the remote vehicle. In some embodiments, responsive to communications between the ego vehicle and the remote vehicle meeting a threshold communication value, reassigning corresponding vehicles in the subgroups.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Figure 1:
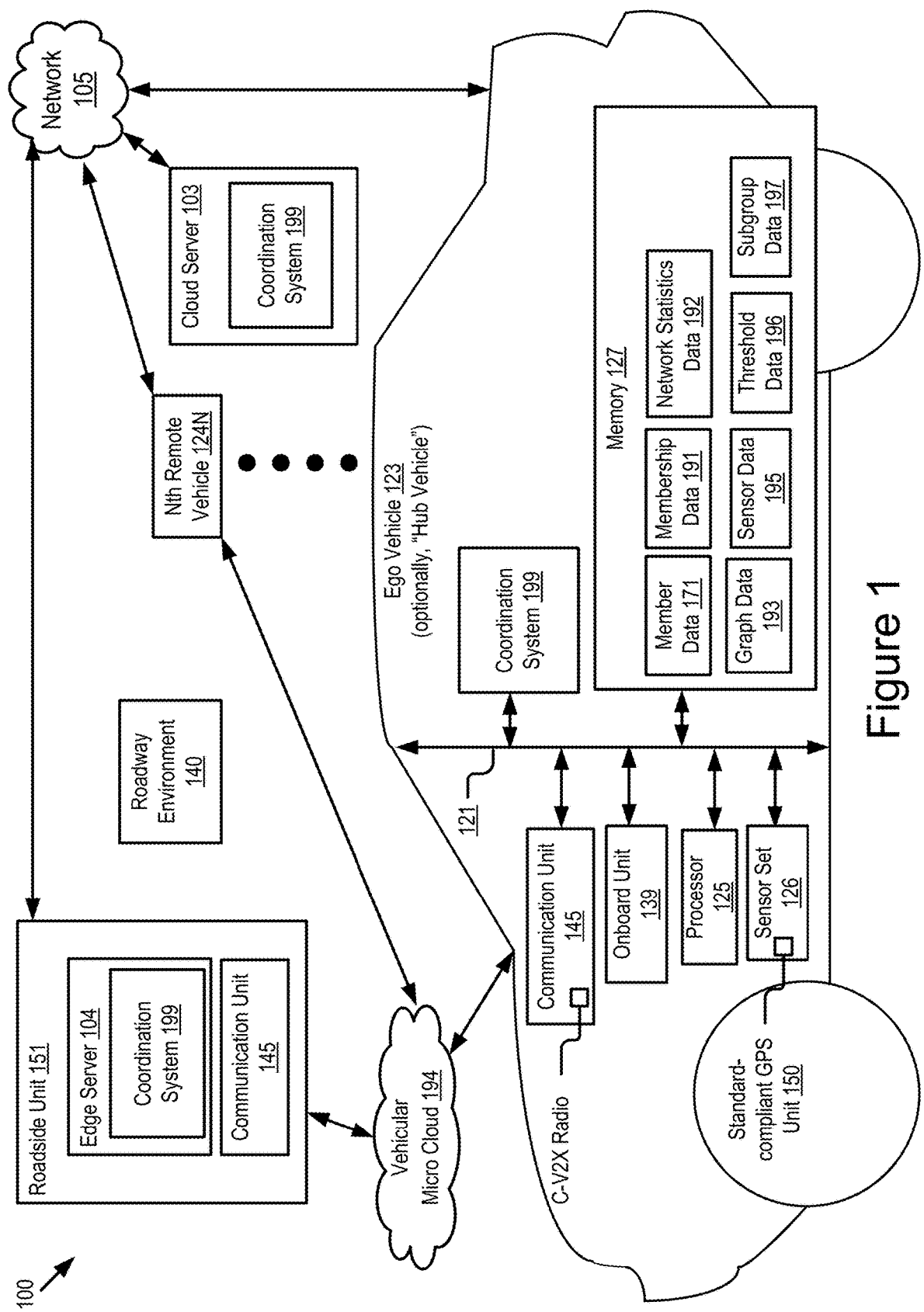
FIG. 1 is a block diagram illustrating an operating environment for a coordination system according to some embodiments.

A connected vehicle is a vehicle that includes technology for vehicle-to-vehicle (V2V) communication. A particular vehicle that includes a communication unit and is operable to send and receive V2X communications via a wireless network (e.g., the network 105 depicted in FIG. 1) is referred to herein as an "ego vehicle" and other vehicles in the vicinity of the ego vehicle are referred to as "remote vehicles." As used herein, the term "vehicle" includes a connected vehicle. Accordingly, as used herein, the terms "vehicle" and "connected vehicle" may be used interchangeably. The embodiments described herein are beneficial for both drivers of human-driven vehicles as well as the autonomous driving systems of autonomous vehicles.

Vehicle Cloudification

Some of the embodiments described herein are motivated by the emerging concept of "vehicle cloudification." Vehicle cloudification means that vehicles equipped with on-board computer unit(s) and wireless communication functionalities form a cluster, called a vehicular micro cloud, and collaborate with other micro cloud members over V2V networks or vehicle-to-everything (V2X) networks to perform computation, data storage, and data communication tasks in an efficient way. These types of tasks are referred to herein as "vehicular micro cloud tasks" if plural, or a "vehicular micro cloud task" if singular.

In some embodiments, a vehicular micro cloud task includes a coordinated driving maneuver executed by a plurality of vehicles. A coordinated driving maneuver includes the members of a vehicular micro cloud driving to specific locations at specific times or performing other driving tasks in a planned manner, which achieves an overall driving circumstance. In this situation, the vehicular micro cloud task is the overall driving circumstance and the sub-tasks of the vehicular micro cloud task includes the actions performed by the connected vehicles.

In embodiments where a vehicular micro cloud task includes a coordinated driving maneuver executed by a plurality of vehicles, a vehicular micro cloud task includes one or more of the following overall driving circumstances: providing increased safety at a second time relative to the safety of the roadway environment at an earlier first time; isolating a vehicle that is driving erratically or unsafely; enabling safety or faster movement for a particular vehicle or set of vehicles (e.g., emergency responders, a vehicle with a passenger that needs emergency assistance, etc.); enabling faster driving within legal limits for one or more vehicles at a second time relative to the speed of driving at a first time; enabling slower driving within legal limits for one or more vehicles at a second time relative to the speed of driving at a first time; responding to an event such as a pothole, construction, debris, a traffic accident, an animal in the road, flooding, a natural disaster; increasing fuel efficiency for a group of vehicles; and coordinating the most efficient and/or safest evacuation of a group of vehicles away from a natural disaster. This list of overall driving circumstances is not exhaustive and is only intended for illustrative purposes. An overall driving circumstance includes any circumstance in a roadway environment that is achievable by coordinating driving maneuvers executed by a plurality of vehicles.

For example, a vehicular micro cloud task includes the members of a vehicular micro cloud driving in a particular driving formation to achieve a particular overall driving circumstance at an end time. The sub-tasks include different locations that different vehicles need to be present at for different times in order to achieve the particular formation at the end time. In embodiments where the vehicular micro cloud is divided into subgroups, different subgroups are assigned different sub-tasks, and when these sub-tasks are executed in the aggregate by all the subgroups, the overall result is that the members of the vehicular micro cloud are driving in the particular driving formation at the end time so that the overall driving circumstance is achieved.

In some embodiments, a vehicular micro cloud task includes any computational, data storage, or data communication task collaboratively performed by a plurality of the members of a vehicular micro cloud.

In some embodiments, a computational task includes a processor executing code and routines to output a result. The result includes digital data that describes the output of executing the code and routines. For example, a computational task includes a processor executing code and routines to solve a problem, and the result includes digital data that describes the solution to the problem. In some embodiments, the computational task is broken down into sub-tasks whose completion is equivalent to completion of the computational task. In this way, the processors of a plurality of micro cloud members are assigned different sub-tasks configured to complete the computational task; the micro cloud members take steps to complete the sub-tasks in parallel and share the result of the completion of the sub-task with one another via V2X wireless communication. In this way, the plurality of micro cloud members work together collaboratively to complete the computational task. The processors include, for example, the onboard units or electronic control units (ECUs) of a plurality of connected vehicles that are micro cloud members.

In some embodiments, a data storage task includes a processor storing digital data in a memory of a connected vehicle. For example, a digital data file which is too big to be stored in the memory of any one vehicle is stored in the memory of multiple vehicles. In some embodiments, the data storage task is broken down into sub-tasks whose completion is equivalent to completion of the data storage task. In this way, the processors of a plurality of micro cloud members are assigned different sub-tasks configured to complete the data storage task; the micro cloud members take steps to complete the sub-tasks in parallel and share the result of the completion of the sub-task with one another via V2X wireless communication. In this way, the plurality of micro cloud members work together collaboratively to complete the data storage task. For example, a sub-task for a data storage task includes storing a portion of a digital data file in a memory of a micro cloud member; other micro cloud members are assigned sub-tasks to store the remaining portions of digital data file in their memories so that collectively the entire file is stored across the vehicular micro cloud or a sub-set of the vehicular micro cloud.

In some embodiments, a data communication task includes a processor using some or all of the network bandwidth available to the processor (e.g., via the communication unit of the connected vehicle) to transmit a portion a V2X wireless message to another endpoint. For example, a V2X wireless message includes a payload whose file size is too big to be transmitted using the bandwidth available to any one vehicle and so the payload is broken into segments and transmitted at the same time (or contemporaneously) via multiple wireless messages by multiple micro cloud members. In some embodiments, the data communication task is broken down into sub-tasks whose completion is equivalent to completion of the data storage task. In this way, the processors of a plurality of micro cloud members are assigned different sub-tasks configured to complete the data storage task; the micro cloud members take steps to complete the sub-tasks in parallel and share the result of the completion of the sub-task with one another via V2X wireless communication. In this way, the plurality of micro cloud members work together collaboratively to complete the data storage task. For example, a sub-task for a data communication task includes transmitting a portion of a payload for a V2X message to a designated endpoint; other micro cloud members are assigned sub-tasks to transmit the remaining portions of payload using their available bandwidth so that collectively the entire payload is transmitted.

In some embodiments, a vehicular micro cloud task is collaboratively performed by the plurality of members executing computing processes in parallel that are configured to complete the execution of the vehicular micro cloud task.

Vehicular micro clouds are beneficial, for example, because they help vehicles to perform computationally expensive tasks that they could not perform alone or store large data sets that they could not store alone.

Vehicular micro clouds are described in the patent applications that are incorporated by reference in this paragraph. This patent application is related to the following patent applications, the entirety of each of which is incorporated herein by reference: U.S. patent application Ser. No. 15/358,567 filed on Nov. 22, 2016 and entitled "Storage Service for Mobile Nodes in a Roadway Area"; U.S. patent application Ser. No. 15/799,442 filed on Oct. 31, 2017 and entitled "Service Discovery and Provisioning for a Macro-Vehicular Cloud"; U.S. patent application Ser. No. 15/845,945 filed on Dec. 18, 2017 and entitled "Managed Selection of a Geographical Location for a Micro-Vehicular Cloud"; and U.S. patent application Ser. No. 15/799,963 filed on Oct. 31, 2017 and entitled "Identifying a Geographic Location for a Stationary Micro-Vehicular Cloud."

In some embodiments, a typical use case of vehicular micro clouds is a data storage service, where vehicles in a micro cloud collaboratively keep data contents in their on-board data storage device. The vehicular micro cloud allows vehicles in and around the vehicular micro cloud to request the data content from micro cloud member(s) over V2V communications, reducing the need to access remote cloud servers by vehicle-to-network (e.g., cellular) communications. For some use cases, micro cloud members may also update the cached data contents on the spot with minimal intervention by remote cloud/edge servers (e.g., updating a high-definition road map based on measurements from on-board sensors). This paragraph is not intended to limit the functionality of the embodiments described herein to data storage. As described herein, the embodiments are operable to provide other vehicular micro cloud tasks in addition to data storage tasks.

The endpoints that are part of the vehicular micro cloud may be referred to herein as "members," "micro cloud members," or "member vehicles." Examples of members include one or more of the following: a connected vehicle; an edge server; a cloud server; any other connected device that has computing resources and has been invited to join the vehicular micro cloud by a handshake process. In some embodiments, the term "member vehicle" specifically refers to only connected vehicles that are members of the vehicular micro cloud whereas the terms "members" or "micro cloud members" is a broader term that may refer to one or more of the following: endpoints that are vehicles; and endpoints that are not vehicles such as roadside units.

In some embodiments, the communication unit of an ego vehicle includes a V2X radio. The V2X radio operates in compliance with a V2X protocol. In some embodiments, the V2X radio is a cellular-V2X radio ("C-V2X radio"). In some embodiments, the V2X radio broadcasts Basic Safety Messages ("BSM" or "safety message" if singular, "BSMs" or "safety messages" if plural). In some embodiments, the safety messages broadcast by the communication unit include some or all of the system data as its payload. In some embodiments, the system data is included in part 2 of the safety message as specified by a Dedicated Short-Range Communication (DSRC) protocol. In some embodiments, the payload includes digital data that describes, among other things, sensor data that describes a roadway environment that includes the members of the vehicular micro cloud. In some embodiments, the V2X radio broadcasts communications using an intelligent transportation system that is incorporated with 5G and software defined-networking (SDN) (e.g., ITS-5G).

In some embodiments, the coordination system is software installed in an onboard unit (e.g., an electronic control unit (ECU)) of a vehicle having V2X communication capability. The vehicle is a connected vehicle and operates in a roadway environment with N number of remote vehicles that are also connected vehicles, where N is any positive whole number that satisfies a threshold for forming a vehicular micro cloud. The roadway environment may include one or more of the following example elements: an ego vehicle; N remote vehicles; an edge server; and a roadside unit. For the purpose of clarity, the N remote vehicles may be referred to herein as the "remote vehicle" or the "remote vehicles" and this will be understood to describe N remote vehicles.

The ego vehicle and the remote vehicles may be human-driven vehicles, autonomous vehicles, or a combination of human-driven vehicles and autonomous vehicles. In some embodiments, the ego vehicle and the remote vehicles may be equipped with DSRC equipment such as a global positioning system (GPS) unit that has lane-level accuracy and a DSRC radio that is capable of transmitting DSRC messages (e.g., BSMs).

In some embodiments, the ego vehicle and some or all of the remote vehicles include their own instance of a coordination system. For example, in addition to the ego vehicle, some or all of the remote vehicles include an onboard unit having an instance of the coordination system installed therein.

In some embodiments, the ego vehicle and one or more of the remote vehicles are members of a vehicular micro cloud. In some embodiments, the remote vehicles are members of a vehicular micro cloud, but the ego vehicle is not a member of the vehicular micro cloud. In some embodiments, the ego vehicle and some, but not all, of the remote vehicles are members of the vehicular micro cloud. In some embodiments, the ego vehicle and some or all of the remote vehicles are members of the same vehicular macro cloud but not the same vehicular micro cloud, meaning that they are members of various vehicular micro clouds that are all members of the same vehicular macro cloud so that they are still interrelated to one another by the vehicular macro cloud. An example of a vehicular micro cloud according to some embodiments includes the vehicular micro cloud 194 depicted in FIG. 1.

Accordingly, multiple instances of the coordination system are installed in a group of connected vehicles. The group of connected vehicles are arranged as a vehicular micro cloud. As described in more detail below, the coordination system further organizes the vehicular micro cloud into subgroups. Each subgroup includes at least one member of the vehicular micro cloud such that the coordination system manages communications between different subgroups that all belong to the same vehicular micro cloud.

A subgroup includes a subset of the members of a vehicular micro cloud. In some embodiments, the members of the subgroup are organized to form the subgroup by a hub vehicle or a server (e.g., a cloud server or an edge server). An example of subgroups includes the first subgroup 455 and the second subgroup 460 illustrated in FIG. 4B or the nano cloud 505A illustrated in FIG. 5. In embodiments where the coordination system is stored on a cloud server or an edge server, the ego vehicle may receive instructions from the server to be associated with a subgroup. The instructions may include an assignment to a particular subgroup, such as a first subgroup, and a wireless channel or wireless communication technology to use to communication with other members of the particular subgroup.

Hub

In some embodiments, the coordination system that executes a method as described herein (e.g., the method 600 depicted in FIG. 6 or the method 700 in FIG. 7) is an element of a hub or a hub vehicle. For example, the vehicular micro cloud formed by the coordination system includes a hub vehicle that provides the following example functionality in addition to the functionality of the methods described herein: (1) controlling when the set of member vehicles leave the vehicular micro cloud (i.e., managing the membership of the vehicular micro cloud, such as who can join, when they can join, when they can leave, etc.); (2) determining how to use the pool of vehicular computing resources to complete a set of tasks in an order for the set of member vehicles wherein the order is determined based on a set of factors that includes safety; (3) determining how to use the pool of vehicular computing resources to complete a set of tasks that do not include any tasks that benefit the hub vehicle; and determining when no more tasks need to be completed, or when no other member vehicles are present except for the hub vehicle, and taking steps to dissolve the vehicular micro cloud responsive to such determinations.

The "hub vehicle" may be referred to herein as the "hub." An example of a hub vehicle according to some embodiments includes the ego vehicle 123 depicted in FIG. 1.

In some embodiments, the coordination system determines which member vehicle from a group of vehicles (e.g., the ego vehicle and one or more remote vehicles) will serve as the hub vehicle based on a set of factors that indicate which vehicle (e.g., the ego vehicle or one of the remote vehicles) is the most technologically sophisticated. For example, the member vehicle that has the fastest onboard computer may be the hub vehicle. Other factors that may qualify a vehicle to be the hub include one or more of the following: having the most accurate sensors relative to the other members; having the most bandwidth relative to the other members; and having the most unused memory relative to the other members. Accordingly, the designation of which vehicle is the hub vehicle may be based on a set of factors that includes which vehicle has: (1) the fastest onboard computer relative to the other members; (2) the most accurate sensors relative to the other members; (3) the most bandwidth relative to the other members or other network factors such having radios compliant with the most modern network protocols; and (4) most available memory relative to the other members.

In some embodiments, the designation of which vehicle is the hub vehicle changes over time if the coordination system determines that a more technologically sophisticated vehicle joins the vehicular micro cloud. Accordingly, the designation of which vehicle is the hub vehicle is dynamic and not static. In other words, in some embodiments the designation of which vehicle from a group of vehicles is the hub vehicle for that group changes on the fly if a "better" hub vehicle joins the vehicular micro cloud. The factors described in the preceding paragraph are used to determine whether a new vehicle would be better relative to the existing hub vehicle.

In some embodiments, the hub vehicle includes memory that stores technical data. The technical data includes digital data describing the technological capabilities of each vehicle included in the vehicular micro cloud. The hub vehicle also has access to each vehicle's sensor data because these vehicles broadcast V2X messages that include the sensor data as the payload for the V2X messages. An example of such V2X messages include BSMs, which include such sensor data in part 2 of their payload. In some embodiments, the technical data is included in the member data 171 depicted in FIG. 1, which vehicles such as the ego vehicle 123 and the remote vehicle 124 broadcast to one another via BSMs. In some embodiments, the member data 171 also includes the sensor data of the vehicle that transmits the BSM as well as some or all of the other digital data described herein as being an element of the member data 171. Another example includes ITS-5G communications.

A vehicle's sensor data is the digital data recorded by that vehicle's onboard sensor set 126. In some embodiments, an ego vehicle's sensor data includes the sensor data recorded by another vehicle's sensor set 126; in these embodiments, the other vehicle transmits the sensor data to the ego vehicle via a V2X communication such as a BSM, ITS-5G, or some other V2X communication.

In some embodiments, the technical data is an element of the sensor data. In some embodiments, the vehicles distribute their sensor data by transmitting BSMs that includes the sensor data in its payload and this sensor data includes the technical data for each vehicle that transmits a BSM; in this way, the hub vehicle receives the technical data for each of the vehicles included in the vehicular micro cloud.

In some embodiments, the hub vehicle is whichever member vehicle of a vehicular micro cloud has a fastest onboard computer relative to the other member vehicles.

In some embodiments, the coordination system is operable to provide its functionality to operating environments and network architectures that do not include a server. For example, the coordination system is an element of a roadside unit that includes a communication unit 145 but not a server. In another example, the coordination system is an element of another vehicle such as one of the remote vehicles 124.

In some embodiments, the coordination system is operable to provide its functionality even though the vehicle, which includes the coordination system, does not have a Wi-Fi antenna as part of its communication unit. By comparison, some of the existing solutions require the use of a Wi-Fi antenna in order to provide their functionality. Because the coordination system does not require a Wi-Fi antenna, it is able to provide its functionality to more vehicles, including older vehicles without Wi-Fi antennas.

In some embodiments, the coordination system is operable to provide its functionality even though the vehicle which includes the coordination system does not have a V2X radio as part of its communication unit. By comparison, some of the existing solutions require the use of a V2X radio in order to provide their functionality. Because the coordination system does not require a V2X radio, it is able to provide its functionality to more vehicles, including older vehicles without V2X radios.

In some embodiments, the coordination system includes code and routines that, when executed by a processor, cause the processor to control when a member of the vehicular micro cloud may leave or exit the vehicular micro cloud. This approach is beneficial because it means the hub vehicle has certainty about how much computing resources it has at any given time since it controls when vehicles (and their computing resources) may leave the vehicular micro cloud. The existing solutions do not provide this functionality.

In some embodiments, the coordination system includes code and routines that, when executed by a processor, cause the processor to designate a particular vehicle to serve as a hub vehicle responsive to determining that the particular vehicle has sufficient unused computing resources and/or trustworthiness to provide micro cloud services to a vehicular micro cloud using the unused computing resources of the particular vehicle. This is beneficial because it guarantees that only those vehicles having something to contribute to the members of the vehicular micro cloud may join the vehicular micro cloud.

In some embodiments, the coordination system manages the vehicular micro cloud so that it is accessible for membership by vehicles that do not have V2V communication capability. This is beneficial because it ensures that legacy vehicles have access to the benefits provided by the vehicular micro cloud. In some embodiments, the coordination system is configured so that a particular vehicle (e.g., the ego vehicle) is pre-designated by a vehicle manufacturer to serve as a hub vehicle for any vehicular micro cloud that it joins.

The existing solutions generally do not include vehicular micro clouds. Some groups of vehicles (e.g., cliques, platoons, etc.) might appear to be a vehicular micro cloud when they in fact are not a vehicular micro cloud. For example, in some embodiments a vehicular micro cloud requires that all its members share unused computing resources with the other members of the vehicular micro cloud. Any group of vehicles that does not require all its members to share their unused computing resources with the other members is not a vehicular micro cloud.

In some embodiments, a vehicular micro cloud formed by a coordination system is operable to harness the unused computing resources of many different vehicles to perform complex computational tasks that a single vehicle alone cannot perform due to the computational limitations of a vehicle's onboard vehicle computer, which are known to be limited. Accordingly, any group of vehicles that does harness the unused computing resources of many different vehicles to perform complex computational tasks that a single vehicle alone cannot perform is not a vehicular micro cloud.

In some embodiments, a vehicular micro cloud can include vehicles that are parked, vehicles that are traveling in different directions, infrastructure devices, or almost any endpoint that is within communication range of a member of the vehicular micro cloud.

In some embodiments, the coordination system is configured so that vehicles are required to have a predetermined threshold of unused computing resources to become members of a vehicular micro cloud. Accordingly, any group of vehicles that does not require vehicles to have a predetermined threshold of unused computing resources to become members of the group is not a vehicular micro cloud in some embodiments.

In some embodiments, a hub of a vehicular micro cloud is pre-designated by a vehicle manufacturer by the inclusion of one bit or a token in a memory of the vehicle at the time of manufacture that designates the vehicle as the hub of all vehicular micro clouds which it joins. Accordingly, if a group of vehicles does not include a hub vehicle having a bit or a token in their memory from the time of manufacture that designates it as the hub for all groups of vehicles that it joins, then this group is not a vehicular micro cloud in some embodiments.

A vehicular micro cloud is not a V2X network or a V2V network. For example, neither a V2X network nor a V2V network include a cluster of vehicles in a same geographic region that are computationally joined to one another as members of a logically associated cluster that make available their unused computing resources to the other members of the cluster. In some embodiments, any of the steps of a method described herein (e.g., the method depicted in FIG. 6 or FIG. 7) is executed by one or more vehicles that are working together collaboratively using V2X communications for the purpose of completing one or more steps of the method(s). By comparison, solutions that only include V2X networks or V2V networks do not necessarily include the ability of two or more vehicles to work together collaboratively to complete one or more steps of a method.

In some embodiments, a vehicular micro cloud includes vehicles that are parked, vehicles that are traveling in different directions, infrastructure devices, or almost any endpoint that is within communication range of a member of the vehicular micro cloud. By comparison, a group of vehicles that exclude such endpoints as a requirement of being a member of the group are not vehicular micro clouds according to some embodiments.

In some embodiments, a vehicular micro cloud is operable to complete computational tasks itself, without delegation of these computational tasks to a cloud server, using the onboard vehicle computers of its members; this is an example of a vehicular micro cloud task according to some embodiments. In some embodiments, a group of vehicles that relies on a cloud server for its computational analysis, or the difficult parts of its computational analysis, is not a vehicular micro cloud. Although FIG. 1 depicts a server in an operating environment that includes the coordination system, the server is an optional feature of the operating environment.

In some embodiments, the coordination system enables a group of vehicles to perform computationally expensive tasks that could not be completed by any one vehicle in isolation.

In some embodiments, each subgroup included in a vehicular micro cloud includes its own hub that is responsible for organizing the operation of the members that are included in that particular subgroup. For example, the hub of a nano cloud (i.e., a type of subgroup) is responsible for maintaining and updating the roster for the hub, monitoring the performance of the sub-task, monitoring the efficiency of the completion of the sub-task, monitoring when members join or leave the vehicular micro cloud, or communicating with other hubs of nano clouds to facilitate updates to the roster of the nano clouds to optimize performance of the sub-task or compensate for changes of circumstance caused by the membership in the vehicular micro cloud changing.

Cellular Vehicle to Everything (C-V2X)

A DSRC-equipped device is any processor-based computing device that includes a DSRC transmitter and a DSRC receiver. For example, if a vehicle includes a DSRC transmitter and a DSRC receiver, then the vehicle may be described as "DSRC-enabled" or "DSRC-equipped." Other types of devices may be DSRC-enabled. For example, one or more of the following devices may be DSRC-equipped: an edge server; a cloud server; a roadside unit ("RSU"); a traffic signal; a traffic light; a vehicle; a smartphone; a smartwatch; a laptop; a tablet computer; a personal computer; and a wearable device.

In some embodiments, one or more of the connected vehicles described above are DSRC-equipped vehicles. A DSRC-equipped vehicle is a vehicle that includes a standard-compliant GPS unit and a DSRC radio that is operable to lawfully send and receive DSRC messages in a jurisdiction where the DSRC-equipped vehicle is located. A DSRC radio is hardware that includes a DSRC receiver and a DSRC transmitter. The DSRC radio is operable to wirelessly send and receive DSRC messages on a band that is reserved for DSRC messages.

A DSRC message is a wireless message that is specially configured to be sent and received by highly mobile devices such as vehicles, and is compliant with one or more of the following DSRC standards, including any derivative or fork thereof: EN 12253:2004 Dedicated Short-Range Communication-Physical layer using microwave at 5.8 GHz (review); EN 12795:2002 Dedicated Short-Range Communication (DSRC)-DSRC Data link layer: Medium Access and Logical Link Control (review); EN 12834:2002 Dedicated Short-Range Communication-Application layer (review); and EN 13372:2004 Dedicated Short-Range Communication (DSRC)-DSRC profiles for RTTT applications (review); EN ISO 14906:2004 Electronic Fee Collection-Application interface.

A DSRC message is not any of the following: a WiFi message; a 3G message; a 4G message; an LTE message; a millimeter wave communication message; a Bluetooth message; a satellite communication; or a short-range radio message transmitted or broadcast by a key fob at 315 MHz or 433.92 MHz. For example, in the United States, key fobs for remote keyless systems include a short-range radio transmitter which operates at 315 MHz, and transmissions or broadcasts from this short-range radio transmitter are not DSRC messages since, for example, such transmissions or broadcasts do not comply with any DSRC standard, are not transmitted by a DSRC transmitter of a DSRC radio and are not transmitted at 5.9 GHz. In another example, in Europe and Asia, key fobs for remote keyless systems include a short-range radio transmitter which operates at 433.92 MHz, and transmissions or broadcasts from this short-range radio transmitter are not DSRC messages for similar reasons as those described above for remote keyless systems in the United States.

In some embodiments, a DSRC-equipped device (e.g., a DSRC-equipped vehicle) does not include a conventional GPS unit, and instead includes a standard-compliant GPS unit. A conventional GPS unit provides positional information that describes a position of the conventional GPS unit with an accuracy of plus or minus 10 meters of the actual position of the conventional GPS unit. By comparison, a standard-compliant GPS unit provides GPS data that describes a position of the standard-compliant GPS unit with an accuracy of plus or minus 1.5 meters of the actual position of the standard-compliant GPS unit. This degree of accuracy is referred to as "lane-level accuracy" since, for example, a lane of a roadway is generally about 3 meters wide, and an accuracy of plus or minus 1.5 meters is sufficient to identify which lane a vehicle is traveling in even when the roadway has more than one lanes of travel each heading in a same direction.

In some embodiments, a standard-compliant GPS unit is operable to identify, monitor and track its two-dimensional position within 1.5 meters, in all directions, of its actual position 68% of the time under an open sky.

GPS data includes digital data describing the location information outputted by the GPS unit. An example of a standard-compliant GPS unit according to some embodiments includes the standard-compliant GPS unit 150 depicted in FIG. 1.

In some embodiments, the connected vehicle described herein, and depicted in FIG. 1, includes a V2X radio instead of a DSRC radio. In these embodiments, all instances of the term DSRC" as used in this description may be replaced by the term "V2X." For example, the term "DSRC radio" is replaced by the term "V2X radio," the term "DSRC message" is replaced by the term "V2X message," and so on.

Currently, 75 MHz of the 5.9 GHz band is designated for DSRC. However, in some embodiments, the lower 45 MHz of the 5.9 GHz band (specifically, 5.85-5.895 GHz) is reserved by a jurisdiction (e.g., the United States) for unlicensed use (i.e., non-DSRC and non-vehicular related use) whereas the upper 30 MHz of the 5.9 GHz band (specifically, 5.895-5.925 GHz) is reserved by the jurisdiction for Cellular Vehicle to Everything (C-V2X) use. In these embodiments, the V2X radio depicted in FIG. 1 is a C-V2X radio that is operable to send and receive C-V2X wireless messages on the upper 30 MHz of the 5.9 GHz band (i.e., 5.895-5.925 GHz). In these embodiments, the coordination system 199 is operable to cooperate with the C-V2X radio and provide its functionality using the content of the C-V2X wireless messages.

In some of these embodiments, some or all of the digital data depicted in FIG. 1 is the payload for one or more C-V2X messages. In some embodiments, the C-V2X message is a BSM. In some embodiments, the C-V2X message is an ITS-5G message.

In some embodiments, instances of the term "DSRC" as used herein may be replaced by the term "C-V2X." For example, the term "DSRC radio" is replaced by the term "C-V2X radio," the term "DSRC message" is replaced by the term "C-V2X message," and so on.

In some embodiments, instances of the term "V2X" as used herein may be replaced by the term "C-V2X."

Vehicular Network

The coordination system utilizes a vehicular network in some embodiments. A vehicular network includes, for example, one or more of the following: V2V; V2X; vehicle to cloud to vehicle (V2C2V); vehicle-to-network-to-vehicle (V2N2V); vehicle-to-infrastructure (V2I); cellular-V2X (C-V2X); or any derivative or combination of the networks listed herein, etc.

In some embodiments, the coordination system includes software installed in an onboard unit of a connected vehicle. This software is the "coordination system" described herein.

An example operating environment for the embodiments described herein includes an ego vehicle and, optionally, one or more remote vehicles. The ego vehicle and the remote vehicle are connected vehicles having communication units that enable them to send and receive wireless messages via one or more vehicular networks. In some embodiments, the ego vehicle and the remote vehicle each include an onboard unit having a coordination system stored therein.

Figure 6:
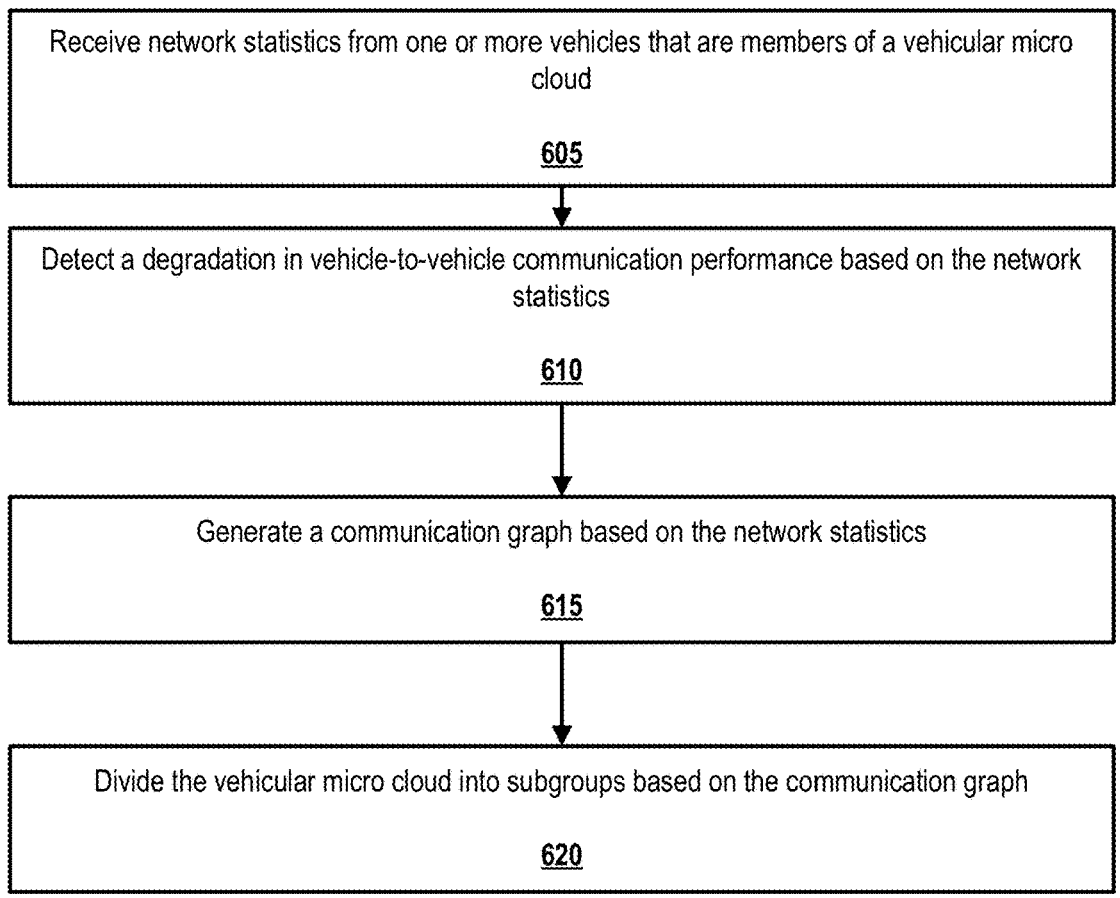
FIG. 6 is a flowchart of an example method for dividing a vehicular micro cloud into subgroups by a coordination system according to some embodiments.
Figure 7:
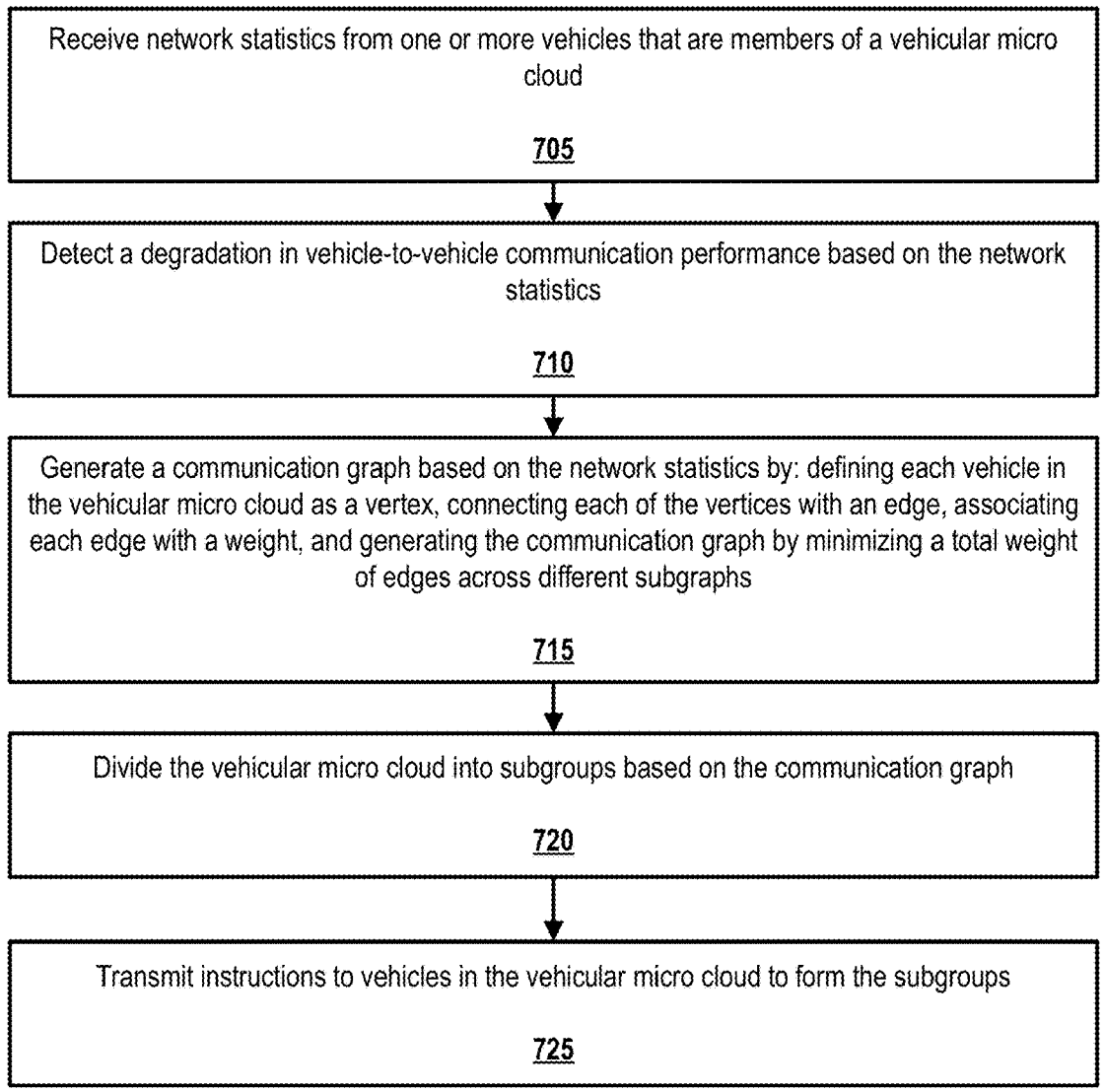
FIG. 7 is a flowchart of an example method for instructing vehicles in a vehicular micro cloud to form subgroups according to some embodiments.

In some embodiments, the coordination system includes code and routines that are operable, when executed by a processor of the onboard unit, to cause the processor to execute one or more of the steps of the method 600 depicted in FIG. 6, one or more steps of the method 700 depicted in FIG. 7, or any other method described herein.

In some embodiments, this application is related to U.S. patent application Ser. No. 15/644,197 filed on Jul. 7, 2017 and entitled "Computation Service for Mobile Nodes in a Roadway Environment," the entirety of which is hereby incorporated by reference.

Example Operative Environment

In some embodiments, a group of connected vehicles form a vehicular micro cloud. The vehicles in the vehicular micro cloud collaborate to perform data processing, sensing, and communication tasks (e.g., vehicular micro cloud tasks) through V2X networks.

The coordination system receives network statistics from one or more vehicles that are members of the vehicular micro cloud. In some embodiments, the coordination system receives the network statistics periodically from each member of the vehicular micro cloud. For example, the network statistics may be part of a basic safety message or other V2V or V2X communication. The network statistics may include an amount of data transmitted between each pair of vehicles in the vehicular micro cloud and/or a network condition, such as channel load and throughput.

The coordination system detects a degradation in V2V communication performance based on the network statistics. For example, the coordination system may determine that there is channel congestion or a latency issue based on the network statistics. In some embodiments, the coordination system determines to take action on the degradation of the V2V communication performance based on a threshold amount of degradation. For example, the coordination system determines to take action when the channel congestion experiences a 60% degradation (or 55%, 50%, etc.). In another example, the coordination system determines to take action if the average latency over a predetermined time window exceeds a threshold value (e.g., more than a 0.1 second transmission) or packet loss occurs.

Figure 3:
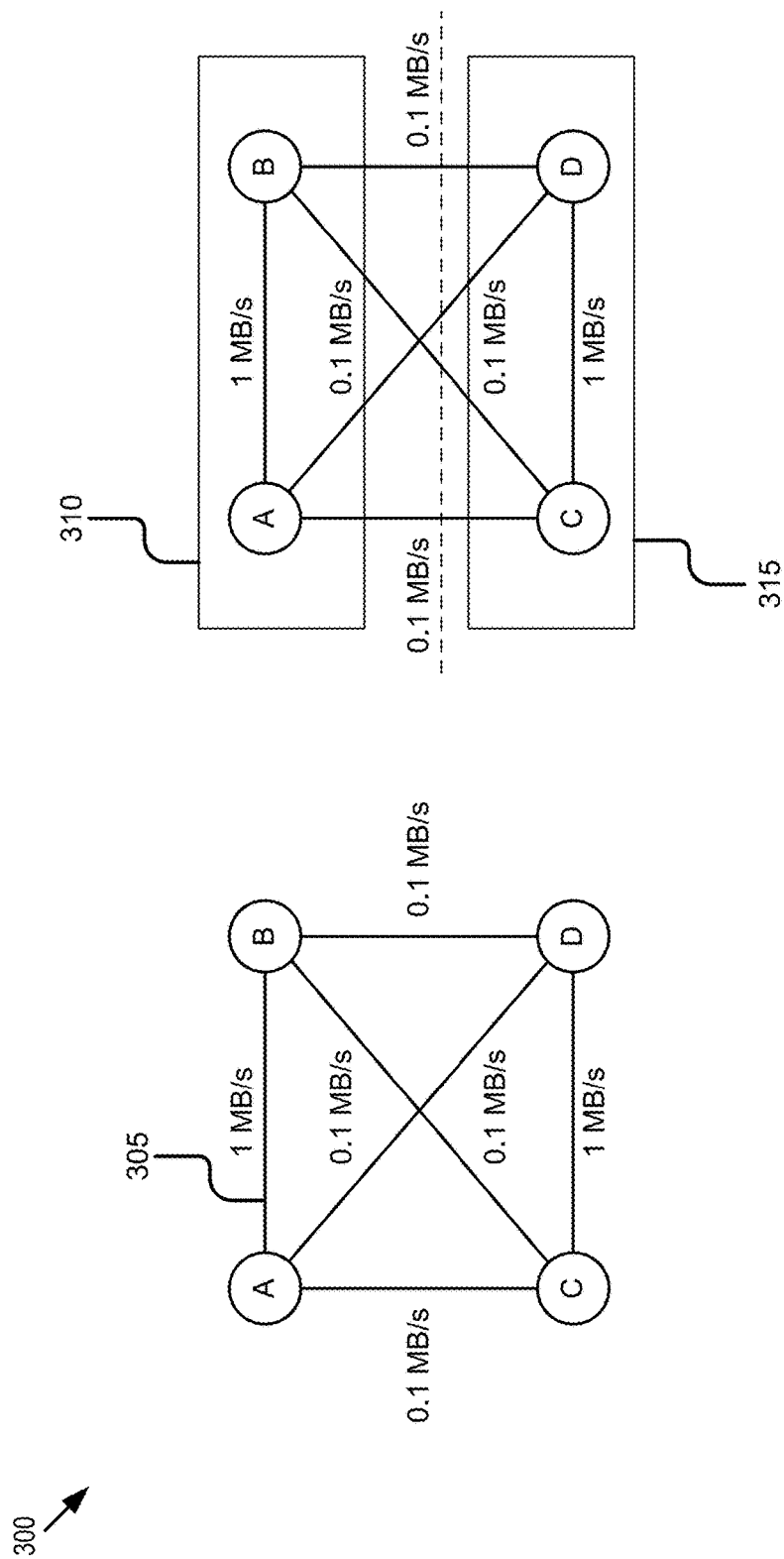
FIG. 3 is a block diagram illustrating a communication graph and how the communication graph is used to determine the subgroups for the vehicular micro cloud according to some embodiments.

In some embodiments, the coordination system generates a communication graph based on the network statistics. The coordination system generates the communication graph by defining each vehicular in the vehicular micro cloud as a vertex. For example, a vehicular micro cloud with six vehicles would have six vertices. The coordination system connects each pair of the vertices with an edge. For example, a communication graph with six vertices includes twelve edges. The coordination system associates each edge with a weight where the weight indicates an amount of network traffic transmitted between a corresponding pair of vehicles in the vehicular micro cloud. For example, the network traffic may be described as an average amount of network traffic in megabytes per second between vehicle A to B and B to A. FIG. 3 includes an example communication graph and is described in greater detail below.

The coordination system divides the vehicular micro cloud into subgroups based on the communication graph. In some embodiments, the coordination system divides the communication graph into a number of subgroups such that a total weight of edges across the subgraphs is minimized and the number of subgraphs matches the number of subgroups. For example, if the communication graph indicates that a first group of three vehicles communicate with each other much more than the other three vehicles in the vehicular micro cloud, the coordination system may divide the vehicular micro cloud into two subgroups. FIG. 3 includes an example divided communication graph and is described in greater detail below.

In some embodiments, the coordination system additionally considers communication latency requirements when dividing the communication graph into subgraphs. For example, the coordination system may assign vehicles to a same subgroup that exchange latency crucial data by implementing stringent latency requirements to the edges of the communication graph.

The coordination system may transmit instructions to the vehicles in the vehicular micro cloud to form the subgroups. For example, where the coordination system is part of a server, the server transmits the instructions to all the vehicles in the vehicular micro cloud. Where the coordination system is part of an ego vehicle, the ego vehicle transmits the instructions to the other vehicles in the vehicular micro cloud. The instructions may include assigning a corresponding vehicle to one of the subgroups and a corresponding wireless channel or corresponding wireless communication technology that is used for communication within the subgroup. For example, the coordination system may assign a first subgroup to channel A and a second subgroup to channel B. The vehicles within subgroup A can communicate directly with other vehicles within subgroup A, but if a vehicle from subgroup A tries to communicate with a vehicle form subgroup B, the communication goes through the coordination system, which forwards the communication to the vehicle in subgroup B. In instances where a server performs the forwarding of the communication, the process may be referred to as a vehicle to cloud to vehicle communication (V2C2V). FIG. 4B includes an example of a communication that is transmitted from a first subgroup to a second subgroup and is described in greater detail below.

The coordination system continues to receive network communications from the vehicles after the subgroups are formed. In some embodiments, the coordination system further divides the subgroups based on the network statistics. For example, the coordination system updates the communication graph based on more recent network statistics and determines that an amount of communications between a first subgroup and a second vehicle in a second subgroup meet a threshold communication value. Responsive to meeting the threshold communication value, the coordination system reassigns corresponding vehicles in the subgroups.

In another example, if communications between a first vehicle in a first subgroup and a second vehicle in a second subgroup meet a threshold communication value, the coordination system reassigns corresponding vehicles in the subgroups. In yet another example, if a wireless channel associated with a first subgroup becomes saturated, the coordination system divides the first subgroup into a third subgroup and a fourth subgroup (as opposed to a second subgroup, which already exists in this example).

As described herein, dividing the vehicular micro cloud into subgroups is proposed to correct for degradation of V2V communications between vehicles in the vehicular micro cloud. Furthermore, updating the subgroups responsive to updated network statistics ensures that the subgroups continue to correct for degradation of V2V communications.

Embodiments of the coordination system are now described. Referring now to FIG. 1, depicted is a block diagram illustrating an operating environment 100 for a coordination system 199 according to some embodiments. The operating environment 100 is present in a roadway environment 140. In some embodiments, each of the elements of the operating environment 100 is present in the same roadway environment 140 at the same time. In some embodiments, some of the elements of the operating environment 100 are not present in the same roadway environment 140 at the same time.

The operating environment 100 may include one or more of the following elements: an ego vehicle 123 (referred to herein as a "vehicle 123" or an "ego vehicle 123"); an Nth remote vehicle 124 (where "N" refers to any positive whole number greater than one); a roadside unit 151; and a cloud server 103. These elements are communicatively coupled to one another via a network 105. These elements of the operating environment 100 are depicted by way of illustration. In practice, the operating environment 100 may include one or more of the elements depicted in FIG. 1. The Nth remote vehicle 124 may be referred to as a remote vehicle 124.

In some embodiments, one or more of the ego vehicle 123, the remote vehicle 124, and the network 105 are elements of a vehicular micro cloud 194. As depicted, the roadside unit 151 includes an edge server 104.

In some embodiments, the ego vehicle 123, the remote vehicle 124, the edge server 104, and the cloud server 103 include similar elements. For example, each of these elements of the operating environment 100 include their own processor 125, bus 121, memory 127, communication unit 145, processor 125, sensor set 126, onboard unit 139 (not included in the edge server 104 or the cloud server 103), standard-compliant GPS unit 150 (not included in the edge server 104 or the cloud server 103), and coordination system 199. These elements of the ego vehicle 123, the remote vehicle 124, the edge server 104, and the cloud server 103 provide the same or similar functionality regardless of whether they are included in the ego vehicle 123, the remote vehicle 124, the edge server 104, or the cloud server 103. Accordingly, the descriptions of these elements will not be repeated in this description for each of the ego vehicle 123, the remote vehicle 124, the edge server 104, and the cloud server 103.

In the depicted embodiment, the ego vehicle 123, the remote vehicle 124, the edge server 104, and the cloud server 103 store similar digital data.

In some embodiments, the vehicular micro cloud 194 is a stationary vehicular micro cloud such as described by U.S. patent application Ser. No. 15/799,964 filed on Oct. 31, 2017 and entitled "Identifying a Geographic Location for a Stationary Micro-Vehicular Cloud," the entirety of which is herein incorporated by reference.

In some embodiments, the vehicular micro cloud 194 is a stationary vehicular micro cloud or a mobile vehicular micro cloud. For example, each of the ego vehicle 123 and the remote vehicle 124 are vehicular micro cloud members because they are connected endpoints that are members of the vehicular micro cloud 194 that can access and use the unused computing resources (e.g., their unused processing power, unused data storage, unused sensor capabilities, unused bandwidth, etc.) of the other vehicular micro cloud members using wireless communications that are transmitted via the network 105 and these wireless communicates are not required to be relayed through a cloud server. As used in this patent application, the terms a "vehicular micro cloud" and a "micro-vehicular" cloud mean the same thing.

In some embodiments, the vehicular micro cloud 194 is a vehicular micro cloud such as the one described in U.S. patent application Ser. No. 15/799,963.

In some embodiments, a vehicular micro cloud 194 is not a V2X network or a V2V network because, for example, such networks do not include allowing endpoints of such networks to access and use the unused computing resources of the other endpoints of such networks. By comparison, a vehicular micro cloud 194 requires allowing all members of the vehicular micro cloud 194 to access and use designated unused computing resources of the other members of the vehicular micro cloud 194. In some embodiments, endpoints must satisfy a threshold of unused computing resources in order to join the vehicular micro cloud 194. The hub vehicle of the vehicular micro cloud 194 executes a process to: (1) determine whether endpoints satisfy the threshold as a condition for joining the vehicular micro cloud 194; and (2) determine whether the endpoints that do join the vehicular micro cloud 194 continue to satisfy the threshold after they join as a condition for continuing to be members of the vehicular micro cloud 194.

In some embodiments, a member of the vehicular micro cloud 194 includes any endpoint (e.g., the ego vehicle 123, the remote vehicle 124, etc.) which has completed a process to join the vehicular micro cloud 194 (e.g., a handshake process with the coordinator of the vehicular micro cloud 194). Cloud servers are excluded from membership in some embodiments. A member of the vehicular micro cloud 194 is described herein as a "member" or a "micro cloud member." In some embodiments, a coordinator of the vehicular micro cloud 194 is the hub of the vehicular micro cloud (e.g., the ego vehicle 123).

In some embodiments, the memory 127 of one or more of the endpoints stores member data 171. The member data 171 is digital data that describes one or more of the following: the identity of each of the micro cloud members; what digital data, or bits of data, are stored by each micro cloud member; what computing services are available from each micro cloud member; what computing resources are available from each micro cloud member and what quantity of these resources are available; and how to communicate with each micro cloud member.

In some embodiments, the member data 171 describes logical associations between endpoints that are a necessary component of the vehicular micro cloud 194 and serves to differentiate the vehicular micro cloud 194 from a mere V2X network. In some embodiments, a vehicular micro cloud 194 must include a hub vehicle and this is a further differentiation from a vehicular micro cloud 194 and a V2X network or a group, clique, or platoon of vehicles which is not a vehicular micro cloud 194.

In some embodiments, the vehicular micro cloud 194 does not include a hardware server. Accordingly, in some embodiments the vehicular micro cloud 194 may be described as serverless. In some embodiments, the vehicular micro cloud 194 includes a server. For example, in some embodiments the edge server 104 is the hub of the vehicular micro cloud 194.

The network 105 may be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices and/or entities may communicate. In some embodiments, the network 105 may include a peer-to-peer network. The network 105 may also be coupled to or may include portions of a telecommunications network for sending data in a variety of different communication protocols. In some embodiments, the network 105 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communication, mmWave, WiFi (infrastructure mode), WiFi (ad-hoc mode), visible light communication, TV white space communication and satellite communication. The network 105 may also include a mobile data network that may include 3G, 4G, 5G, LTE, LTE-V2X, LTE-D2D, VoLTE or any other mobile data network or combination of mobile data networks. Further, the network 105 may include one or more IEEE 802.11 wireless networks.

In some embodiments, the network 105 is a V2X network. For example, the network 105 must include a vehicle, such as the ego vehicle 123, as an originating endpoint for each wireless communication transmitted by the network 105. An originating endpoint is the endpoint that initiated a wireless communication using the network 105. In some embodiments, the network 105 is a vehicular network.

In some embodiments, the network 105 is a C-V2X network.

The network 105 is an element of the vehicular micro cloud 194. Accordingly, the vehicular micro cloud 194 is not the same thing as the network 105 since the network is merely a component of the vehicular micro cloud 194. For example, the network 105 does not include member data 171. The network 105 also does not include a hub vehicle.

In some embodiments, one or more of the ego vehicle 123 and the remote vehicle 124 are C-V2X equipped vehicles. For example, the ego vehicle 123 includes a standard-compliant GPS unit 150 that is an element of the sensor set 126 and a C-V2X radio that is an element of the communication unit 145. The network 105 may include a C-V2X communication channel shared among the ego vehicle 123 and a second vehicle such as the remote vehicle 124.

A C-V2X radio is hardware radio that includes a C-V2X receiver and a C-V2X transmitter. The C-V2X radio is operable to wirelessly send and receive C-V2X messages on a band that is reserved for C-V2X messages.

The ego vehicle 123 may include a car, a truck, a sports utility vehicle, a bus, a semi-truck, a drone, or any other roadway-based conveyance. In some embodiments, the ego vehicle 123 may include an autonomous vehicle or a semi-autonomous vehicle. Although not depicted in FIG. 1, in some embodiments, the ego vehicle 123 includes an autonomous driving system. The autonomous driving system includes code and routines that provide autonomous driving features to the ego vehicle 123 to render the ego vehicle 123 an autonomous vehicle or a highly autonomous vehicle. In some embodiments, the ego vehicle 123 is a Level III autonomous vehicle or higher as defined by the National Highway Traffic Safety Administration and the Society of Automotive Engineers.

The ego vehicle 123 is a connected vehicle. For example, the ego vehicle 123 is communicatively coupled to the network 105 and operable to send and receive messages via the network 105. For example, the ego vehicle 123 transmits and receives C-V2X messages via the network 105.

The ego vehicle 123 includes one or more of the following elements: a processor 125; a sensor set 126; a standard-compliant GPS unit 150; a vehicle control system 153; a communication unit 145; an onboard unit 139; a memory 127; and a coordination system 199. These elements may be communicatively coupled to one another via a bus 121. In some embodiments, the communication unit 145 includes a C-V2X radio.

The processor 125 includes an arithmetic logic unit, a microprocessor, a general-purpose controller, or some other processor array to perform computations and provide electronic display signals to a display device. The processor 125 processes data signals and may include various computing architectures including a complex instruction set computer (CISC) architecture, a reduced instruction set computer (RISC) architecture, or an architecture implementing a combination of instruction sets. Although FIG. 1 depicts a single processor 125 present in the ego vehicle 123, multiple processors may be included in the ego vehicle 123. The processor 125 may include a graphical processing unit. Other processors, operating systems, sensors, displays, and physical configurations may be possible.

In some embodiments, the processor 125 may be an element of a processor-based computing device of the ego vehicle 123. For example, the ego vehicle 123 may include one or more of the following processor-based computing devices and the processor 125 may be an element of one of these devices: an onboard vehicle computer; an electronic control unit; a navigation system; a vehicle control system (e.g., an advanced driver assistance system ("ADAS") or autonomous driving system); a head unit; or the onboard unit 139.

The onboard unit 139 is a special purpose processor-based computing device. In some embodiments, the onboard unit 139 is a communication device that includes one or more of the following elements: the communication unit 145; the processor 125; the memory 127; and the coordination system 199. In some embodiments, the onboard unit 139 is the computer system 200 depicted in FIG. 2. In some embodiments, the onboard unit 139 is an electronic control unit (ECU).

The sensor set 126 includes one or more onboard sensors. The sensor set 126 may record sensor measurements that describe the ego vehicle 123 or the physical environment that includes the ego vehicle 123. The sensor data includes digital data that describes the sensor measurements.

In some embodiments, the sensor set 126 may include one or more sensors that are operable to measure the physical environment outside of the ego vehicle 123. For example, the sensor set 126 may include cameras, lidar, radar, sonar and other sensors that record one or more physical characteristics of the physical environment that is proximate to the ego vehicle 123.

In some embodiments, the sensor set 126 may include one or more sensors that are operable to measure the physical environment inside a cabin of the ego vehicle 123. For example, the sensor set 126 may record an eye gaze of the driver (e.g., using an internal camera), where the driver's hands are located (e.g., using an internal camera) and whether the driver is touching a head unit or infotainment system with their hands (e.g., using a feedback loop from the head unit or infotainment system that indicates whether the buttons, knobs or screen of these devices is being engaged by the driver).

In some embodiments, the sensor set 126 may include one or more of the following sensors: an altimeter; a gyroscope; a proximity sensor; a microphone; a microphone array; an accelerometer; a camera (internal or external); a LIDAR sensor; a laser altimeter; a navigation sensor (e.g., a global positioning system sensor of the standard-compliant GPS unit 150); an infrared detector; a motion detector; a thermostat; a sound detector, a carbon monoxide sensor; a carbon dioxide sensor; an oxygen sensor; a mass air flow sensor; an engine coolant temperature sensor; a throttle position sensor; a crank shaft position sensor; an automobile engine sensor; a valve timer; an air-fuel ratio meter; a blind spot meter; a curb feeler; a defect detector; a Hall effect sensor, a manifold absolute pressure sensor; a parking sensor; a radar gun; a speedometer; a speed sensor; a tire-pressure monitoring sensor; a torque sensor; a transmission fluid temperature sensor; a turbine speed sensor (TSS); a variable reluctance sensor; a vehicle speed sensor (VSS); a water sensor; a wheel speed sensor; and any other type of automotive sensor.

The sensor set 126 is operable to record sensor data 195. The sensor data 195 includes digital data that describes images or other measurements of the physical environment such as the conditions, objects, and other vehicles present in the roadway environment. Examples of objects include pedestrians, animals, traffic signs, traffic lights, potholes, etc. Examples of conditions include weather conditions, road surface conditions, shadows, leaf cover on the road surface, any other condition that is measurable by a sensor included in the sensor set 126.

The physical environment may include a roadway region, parking lot, or parking garage that is proximate to the ego vehicle 123. The sensor data may describe measurable aspects of the physical environment. In some embodiments, the physical environment is the roadway environment 140. As such, in some embodiments, the roadway environment 140 includes one or more of the following: a roadway region that is proximate to the ego vehicle 123; a parking lot that is proximate to the ego vehicle 123; a parking garage that is proximate to the ego vehicle 123; the conditions present in the physical environment proximate to the ego vehicle 123; the objects present in the physical environment proximate to the ego vehicle 123; and other vehicles present in the physical environment proximate to the ego vehicle 123; any other tangible object that is present in the real-world and proximate to the ego vehicle 123 or otherwise measurable by the sensors of the sensor set 126 or whose presence is determinable from the digital data stored on the memory 127. An item is "proximate to the ego vehicle 123" if it is directly measurable by a sensor of the ego vehicle 123 or its presence is inferable and/or determinable by the coordination system 199 based on analysis of the sensor data which is recorded by the ego vehicle 123 and/or one or more of the vehicular micro cloud 194.

In some embodiments, the sensors of the sensor set 126 are operable to collect digital data that is stored as sensor data 195. The sensors of the sensor set 126 include any sensors that are necessary to measure and record the measurements described by the sensor data 195. In some embodiments, the sensor data 195 includes any sensor measurements that are necessary to generate the other digital data stored by the memory 127. In some embodiments, the sensor data 195 includes digital data that describes any sensor measurements that are necessary for the coordination system 199.

In some embodiments, the sensor set 126 includes any sensors that are necessary to record sensor data 195 that describes the roadway environment 140 with enough detail to create a digital twin of the roadway environment 140. In some embodiments, the coordination system 199 generates the subgroups and assigns sub-tasks to the subgroups based on the outcomes observed by the coordination system 199 during the execution of a set of digital twins that simulate the real-life circumstances of the ego vehicle 123.

For example, in some embodiments the coordination system 199 includes simulation software. The simulation software is any simulation software that is capable of simulating an execution of a vehicular micro cloud task by the vehicular micro cloud 194 which is divided into a subgroups. For example, the simulation software is a simulation software that generates a digital twin simulation.

A digital twin is a simulated version of a specific real-world vehicle that exists in a simulation. A structure, condition, behavior, and responses of the digital twin are similar to a structure, condition, behavior, and responses of the specific real-world vehicle that the digital twin represents in the simulation. The digital environment included in the simulation is similar to the real-world roadway environment 140 of the real-world vehicle. The simulation software includes code and routines that are operable to execute simulations based on digital twins of real-world vehicles in the roadway environment.

In some embodiments, the simulation software is integrated with the coordination system 199. In some other embodiments, the simulation software is a standalone software that the coordination system 199 can access to execute digital twin simulations to determine the best way to divide the vehicular micro cloud 194 into subgroups and which sub-tasks to assign which subgroups. The digital twin simulations may also be used by the coordination system 199 to determine how to break down the vehicular micro cloud task into sub-tasks.

The standard-compliant GPS unit 150 includes a GPS unit that is compliant with one or more standards that govern the transmission of V2X wireless communications ("V2X communication" if singular, "V2X communications" if plural). For example, some V2X standards require that BSMs are transmitted at intervals by vehicles and that these BSMs must include within their payload GPS data having one or more attributes.

An example of an attribute for GPS data is accuracy. In some embodiments, the standard-compliant GPS unit 150 is operable to generate GPS measurements which are sufficiently accurate to describe the location of the ego vehicle 123 with lane-level accuracy. Lane-level accuracy is necessary to comply with some of the existing and emerging standards for V2X communication (e.g., C-V2X communication). Lane-level accuracy means that the GPS measurements are sufficiently accurate to describe which lane of a roadway that the ego vehicle 123 is traveling (e.g., the geographic position described by the GPS measurement is accurate to within 1.5 meters of the actual position of the ego vehicle 123 in the real-world). Lane-level accuracy is described in more detail below.

In some embodiments, the standard-compliant GPS unit 150 is compliant with one or more standards governing V2X communications but does not provide GPS measurements that are lane-level accurate.

In some embodiments, the standard-compliant GPS unit 150 includes any hardware and software necessary to make the ego vehicle 123 or the standard-compliant GPS unit 150 compliant with one or more of the following standards governing V2X communications, including any derivative or fork thereof: EN 12253:2004 Dedicated Short-Range Communication-Physical layer using microwave at 5.8 GHz (review); EN 12795:2002 Dedicated Short-Range Communication (DSRC)-DSRC Data link layer: Medium Access and Logical Link Control (review); EN 12834:2002 Dedicated Short-Range Communication-Application layer (review); and EN 13372:2004 Dedicated Short-Range Communication (DSRC)-DSRC profiles for RTTT applications (review); EN ISO 14906:2004 Electronic Fee Collection-Application interface.

In some embodiments, the standard-compliant GPS unit 150 is operable to provide GPS data describing the location of the ego vehicle 123 with lane-level accuracy. For example, the ego vehicle 123 is traveling in a lane of a multi-lane roadway. Lane-level accuracy means that the lane of the ego vehicle 123 is described by the GPS data so accurately that a precise lane of travel of the ego vehicle 123 may be accurately determined based on the GPS data for this vehicle 123 as provided by the standard-compliant GPS unit 150.

An example process for generating GPS data describing a geographic location of an object (e.g., a queue, the ego vehicle 123, the remote vehicle 124, or some other object located in a roadway environment) is now described according to some embodiments. In some embodiments, the coordination system 199 include code and routines that are operable, when executed by the processor 125, to cause the processor to: analyze (1) GPS data describing the geographic location of the ego vehicle 123 and (2) sensor data describing the range separating the ego vehicle 123 from an object and a heading for this range; and determine, based on this analysis, GPS data describing the location of the object. The GPS data describing the location of the object may also have lane-level accuracy because, for example, it is generated using accurate GPS data of the ego vehicle 123 and accurate sensor data describing information about the object.

In some embodiments, the standard-compliant GPS unit 150 includes hardware that wirelessly communicates with a GPS satellite (or GPS server) to retrieve GPS data that describes the geographic location of the ego vehicle 123 with a precision that is compliant with a V2X standard. One example of a V2X standard is the DSRC standard. Other standards governing V2X communications are possible. The DSRC standard requires that GPS data be precise enough to infer if two vehicles (one of which is, for example, the ego vehicle 123) are located in adjacent lanes of travel on a roadway. In some embodiments, the standard-compliant GPS unit 150 is operable to identify, monitor and track its two-dimensional position within 1.5 meters of its actual position 68% of the time under an open sky. Since roadway lanes are typically no less than 3 meters wide, whenever the two-dimensional error of the GPS data is less than 1.5 meters the coordination system 199 described herein may analyze the GPS data provided by the standard-compliant GPS unit 150 and determine what lane the ego vehicle 123 is traveling in based on the relative positions of two or more different vehicles (one of which is, for example, the ego vehicle 123) traveling on a roadway at the same time.

By comparison to the standard-compliant GPS unit 150, a conventional GPS unit which is not compliant with the DSRC standard is unable to determine the location of a vehicle (e.g., the ego vehicle 123) with lane-level accuracy. For example, a typical roadway lane is approximately 3 meters wide. However, a conventional GPS unit only has an accuracy of plus or minus 10 meters relative to the actual location of the ego vehicle 123. As a result, such conventional GPS units are not sufficiently accurate to enable the coordination system 199 to determine the lane of travel of the ego vehicle 123. This measurement improves the accuracy of the GPS data describing the location of lanes used by the ego vehicle 123 when the coordination system 199 is providing its functionality.

In some embodiments, the memory 127 stores two types of GPS data. The first is GPS data of the ego vehicle 123 and the second is GPS data of one or more objects (e.g., the remote vehicle 124 or some other object in the roadway environment). The GPS data of the ego vehicle 123 is digital data that describes a geographic location of the ego vehicle 123. The GPS data of the objects is digital data that describes a geographic location of an object. One or more of these two types of GPS data may have lane-level accuracy.

In some embodiments, one or more of these two types of GPS data are described by the sensor data 195. For example, the standard-compliant GPS unit 150 is a sensor included in the sensor set 126 and the GPS data is an example type of sensor data 195.

The communication unit 145 transmits and receives data to and from a network 105 or to another communication channel. In some embodiments, the communication unit 145 may include a DSRC transmitter, a DSRC receiver and other hardware or software necessary to make the ego vehicle 123 a DSRC-equipped device. In some embodiments, the coordination system 199 is operable to control all or some of the operation of the communication unit 145.

In some embodiments, the communication unit 145 includes a port for direct physical connection to the network 105 or to another communication channel. For example, the communication unit 145 includes a USB, SD, CAT-5, or similar port for wired communication with the network 105. In some embodiments, the communication unit 145 includes a wireless transceiver for exchanging data with the network 105 or other communication channels using one or more wireless communication methods, including: IEEE 802.11; IEEE 802.16, BLUETOOTH®; EN ISO 14906:2004 Electronic Fee Collection-Application interface EN 11253:2004 Dedicated Short-Range Communication-Physical layer using microwave at 5.8 GHz (review); EN 12795:2002 Dedicated Short-Range Communication (DSRC) DSRC Data link layer: Medium Access and Logical Link Control (review); EN 12834:2002 Dedicated Short-Range Communication-Application layer (review); EN 13372:2004 Dedicated Short-Range Communication (DSRC)-DSRC profiles for RTTT applications (review); the communication method described in U.S. patent application Ser. No. 14/471,387 filed on Aug. 28, 2014 and entitled "Full-Duplex Coordination System"; or another suitable wireless communication method.

In some embodiments, the communication unit 145 includes a full-duplex coordination system as described in U.S. Pat. No. 9,369,262 filed on Aug. 28, 2014 and entitled "Full-Duplex Coordination System," the entirety of which is incorporated herein by reference. In some embodiments, some, or all of the communications necessary to execute the methods described herein are executed using full-duplex wireless communication as described in U.S. Pat. No. 9,369,262.

In some embodiments, the communication unit 145 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some embodiments, the communication unit 145 includes a wired port and a wireless transceiver. The communication unit 145 also provides other conventional connections to the network 105 for distribution of files or media objects using standard network protocols including TCP/IP, HTTP, HTTPS, and SMTP, millimeter wave, DSRC, etc.

In some embodiments, the communication unit 145 includes a V2X radio. The V2X radio is a hardware unit that includes one or more transmitters and one or more receivers that is operable to send and receive any type of V2X message. In some embodiments, the V2X radio is a C-V2X radio that is operable to send and receive C-V2X messages. In some embodiments, the C-V2X radio is operable to send and receive C-V2X messages on the upper 30 MHz of the 5.9 GHz band (i.e., 5.895-5.925 GHz). In some embodiments, some or all of the wireless messages described above with reference to the method 600 depicted in FIG. 6 or the method 700 depicted in FIG. 7 are transmitted by the C-V2X radio on the upper 30 MHz of the 5.9 GHz band (i.e., 5.895-5.925 GHz) as directed by the coordination system 199.

In some embodiments, the V2X radio includes a DSRC transmitter and a DSRC receiver. The DSRC transmitter is operable to transmit and broadcast DSRC messages over the 5.9 GHz band. The DSRC receiver is operable to receive DSRC messages over the 5.9 GHz band. In some embodiments, the DSRC transmitter and the DSRC receiver operate on some other band which is reserved exclusively for DSRC.

In some embodiments, the V2X radio includes a non-transitory memory which stores digital data that controls the frequency for broadcasting BSMs. In some embodiments, the non-transitory memory stores a buffered version of the GPS data for the ego vehicle 123 so that the GPS data for the ego vehicle 123 is broadcast as an element of the BSM messages which are regularly broadcast by the V2X radio (e.g., at an interval of once every 0.10 seconds).

In some embodiments, the V2X radio includes any hardware or software which is necessary to make the ego vehicle 123 compliant with the DSRC standards. In some embodiments, the standard-compliant GPS unit 150 is an element of the V2X radio.

The memory 127 may include a non-transitory storage medium. The memory 127 may store instructions or data that may be executed by the processor 125. The instructions or data may include code for performing the techniques described herein. The memory 127 may be a dynamic random-access memory (DRAM) device, a static random-access memory (SRAM) device, flash memory, or some other memory device. In some embodiments, the memory 127 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In some embodiments, the memory 127 may store any or all of the digital data or information described herein. As depicted in FIG. 1, the memory 127 stores the following digital data: the member data 171; the membership data 191; network statistics data 192; graph data 193; the sensor data 195; and threshold data 196. These elements were described above with reference to the example general method, and so, those descriptions will not be repeated here: the member data 171 and the sensor data 195.

The membership data 191 includes digital data that describes which vehicles (e.g., the ego vehicle 123 and one or more of the remote vehicles 124) are members of the vehicular micro cloud 194.

The network statistics data 192 includes network statistics about the ego vehicle 123 and Nth remote vehicles 124N in the vehicular micro cloud and the subgroups. The network statistics 192 may be extracted from V2X or V2V communications received by the communication unit 145 as well as data generated by the sensor set 126. The network statistics may include an amount of data transmitted between each pair of vehicles in the vehicular micro cloud and/or a network condition, such as channel load and throughput. Because the network statistics are received by the coordination system 199 periodically, the network statistics data 192 includes a most recent version of the network statistics.

The graph data 193 includes data about communication graphs. For example, the graph data 193 may include a number of vertices for each vehicle in the vehicular micro cloud, edges between each pair of the vertices, and a weight for each edge where the weight indicates an amount of network traffic transmitted between a corresponding pair of vehicles in the vehicular micro cloud. Because the network statistics are updated periodically, the coordination system 199 may generate an updated communication graph using recent network statistics.

The threshold data 196 includes digital data that describes any threshold described herein. For example, the threshold data 196 includes threshold values that the coordination system 199 uses for comparisons. The coordination system 199 compares data traffic values for communications between vehicles to a threshold communication value, and if the data traffic value meets the threshold communication value, the coordination system 199 divides the vehicular micro cloud into subgroups, reassigns vehicles in subgroups, or further divides a subgroup into additional subgroups.

The subgroup data 197 includes digital data that describes how the members of the vehicular micro cloud 194 are assigned to the various subgroups. In some embodiments, the subgroup data 197 includes digital data that describes the membership roster for each subgroup created by the coordination system 199.

For example, each subgroup includes at least one member of the vehicular micro cloud 194 so that each subgroup includes a membership roster. The coordination system 199 creates subgroups from the vehicular micro cloud. Different subgroups include different membership rosters relative to one another. The subgroup data 197 includes digital data that describes, among other things, the membership rosters for the subgroups.

In some embodiments, the membership rosters for the set of subgroups are dynamically modified over time during an execution of a plurality of sub-tasks so that at least some of the different membership rosters are different at a second time than they were at a first time. Accordingly, in some embodiments the subgroup data 197 changes over time as the coordination system 199 determines to change that the membership rosters for the subgroups. For example, where the coordination system 199 reassigns the subgroups or further divides a subgroup into additional subgroups, the subgroup data 197 includes updated information about which vehicles are members of which subgroup. The subgroup data 197 may also include an assignment of vehicles to subgroups as well as a wireless channel and/or a wireless communication technology.

In some embodiments, the memory 127 stores some or all of the digital data described herein. In some embodiments, the memory 127 stores any digital data that is necessary for the coordination system 199 to provide its functionality.

In some embodiments, the ego vehicle 123 includes a vehicle control system. A vehicle control system includes one or more ADAS systems or an autonomous driving system. Examples of an ADAS system include one or more of the following elements of a vehicle: an adaptive cruise control ("ACC") system; an adaptive high beam system; an adaptive light control system; an automatic parking system; an automotive night vision system; a blind spot monitor; a collision avoidance system; a crosswind stabilization system; a driver drowsiness detection system; a driver monitoring system; an emergency driver assistance system; a forward collision warning system; an intersection assistance system; an intelligent speed adaption system; a lane keep assistance ("LKA") system; a pedestrian protection system; a traffic sign recognition system; a turning assistant; and a wrong-way driving warning system. Other types of ADAS systems are possible. This list is illustrative and not exclusive.

An ADAS system is an onboard system of the ego vehicle 123 that is operable to identify one or more factors (e.g., using one or more onboard vehicle sensors) affecting the ego vehicle 123 and modify (or control) the operation of the ego vehicle to respond to these identified factors. Described generally, ADAS system functionality includes the process of (1) identifying one or more factors affecting the ego vehicle and (2) modifying the operation of the ego vehicle, or some component of the ego vehicle, based on these identified factors.

For example, an ACC system installed and operational in an ego vehicle may identify that a subject vehicle being followed by the ego vehicle with the cruise control system engaged has increased or decreased its speed. The ACC system may modify the speed of the ego vehicle based on the change in speed of the subject vehicle, and the detection of this change in speed and the modification of the speed of the ego vehicle is an example the ADAS system functionality of the ADAS system.

Similarly, an ego vehicle may have a LKA system installed and operational in an ego vehicle may detect, using one or more external cameras of the ego vehicle, an event in which the ego vehicle is near passing a center yellow line which indicates a division of one lane of travel from another lane of travel on a roadway. The LKA system may provide a notification to a driver of the ego vehicle that this event has occurred (e.g., an audible noise or graphical display) or take action to prevent the ego vehicle from actually passing the center yellow line such as making the steering wheel difficult to turn in a direction that would move the ego vehicle over the center yellow line or actually moving the steering wheel so that the ego vehicle is further away from the center yellow line but still safely positioned in its lane of travel. The process of identifying the event and acting responsive to this event is an example of the ADAS system functionality provided by the LKA system.

The other ADAS systems described above each provide their own examples of ADAS system functionalities which are known in the art, and so, these examples of ADAS system functionality will not be repeated here.

In some embodiments, the ADAS system includes any software or hardware included in the vehicle that makes that vehicle be an autonomous vehicle or a semi-autonomous vehicle. In some embodiments, an autonomous driving system is a collection of ADAS systems which provides ADAS functionality to the ego vehicle 123 to render the ego vehicle 123 an autonomous or semi-autonomous vehicle.

An autonomous driving system includes a set of ADAS systems whose operation render autonomous functionality to render the ego vehicle 123 an autonomous vehicle (e.g., a Level III autonomous vehicle or higher as defined by the National Highway Traffic Safety Administration and the Society of Automotive Engineers).

In some embodiments, the coordination system 199 includes code and routines that are operable, when executed by the processor 125, to execute one or more steps of the method 600 described below with reference to FIG. 6 or one or more steps of the method 700 described below with reference to FIG. 7.

In some embodiments, the coordination system 199 is an element of the onboard unit 139 or some other onboard vehicle computer. In some embodiments, the coordination system 199 includes code and routines that are stored in the memory 127 and executed by the processor 125 or the onboard unit 139.

In some embodiments, the coordination system 199 is implemented using hardware including a field-programmable gate array ("FPGA") or an application-specific integrated circuit ("ASIC"). In some other embodiments, the coordination system 199 is implemented using a combination of hardware and software.

The remote vehicle 124 includes elements and functionality that are similar to those described above for the ego vehicle 123, and so, those descriptions will not be repeated here.

In some embodiments, the ego vehicle 123, the remote vehicle, and the roadside unit 151 are located in a roadway environment 140. The roadway environment is a portion of the real-world that includes a roadway, the ego vehicle 123 and the remote vehicle 124. The roadway environment 140 may include other elements such as the vehicular micro cloud 194, roadway signs, environmental conditions, traffic, objects, etc. Examples of objects include one or of the following: other automobiles, road surfaces; signs, traffic signals, roadway paint, medians, turns, intersections, animals, pedestrians, debris, potholes, accumulated water, accumulated mud, gravel, roadway construction, cones, bus stops, poles, entrance ramps, exit ramps, breakdown lanes, merging lanes, other lanes, railroad tracks, railroad crossings, and any other tangible object that is present in a roadway environment 140 or otherwise observable or measurable by a camera or some other sensor included in the sensor set.

The roadway environment 140 includes some or all of the tangible and/or measurable qualities described above with reference to the sensor data. In some embodiments, the real-world includes human experience comprising physical objects and excludes artificial environments and "virtual" worlds such as computer simulations.

In some embodiments, the roadway environment 140 includes a roadside unit 151 that in includes an edge server 104. The edge server 104 is a connected processor-based computing device that is not a member of the vehicular micro cloud 194 and includes an instance of the coordination system 199 and a communication unit 145.

In some embodiments, the edge server 104 is one or more of the following: a hardware server; a personal computer; a laptop; a device such as a roadside unit which is not a member of the vehicular micro cloud 194; or any other processor-based connected device that is not a member of the vehicular micro cloud 194 and includes an instance of the coordination system 199 and a non-transitory memory that stores some or all of the digital data that is stored by the memory 127 of the ego vehicle 123 or otherwise described herein. The edge server 104 may include a backbone network.

The edge server 104 includes an instance of the coordination system 199. In some embodiments, the coordination system 199 includes code and routines that are operable, when executed by the processor 125, to execute one or more steps of the method 600 described below with reference to FIG. 6 or the method 700 described below with reference to FIG. 7.

In some embodiments, the vehicular micro cloud 194 is stationary. In other words, in some embodiments the vehicular micro cloud 194 is a "stationary vehicular micro cloud." A stationary vehicular micro cloud is a wireless network system in which a plurality of connected vehicles (such as the ego vehicle 123, the remote vehicle 124, etc.), and optionally devices such as a roadside unit 151, form a cluster of interconnected vehicles that are located at a same geographic region. These connected vehicles (and, optionally, connected devices) are interconnected via C-V2X, Wi-Fi, mmWave, DSRC or some other form of V2X wireless communication. For example, the connected vehicles are interconnected via a V2X network which may be the network 105 or some other wireless network that is only accessed by the members of the vehicular micro cloud 194 and not non-members such as the cloud server 103. Connected vehicles (and devices such as a roadside unit) which are members of the same stationary vehicular micro cloud make their unused computing resources available to the other members of the stationary vehicular micro cloud.

In some embodiments, the vehicular micro cloud 194 is "stationary" because the geographic location of the vehicular micro cloud 194 is static; different vehicles constantly enter and exit the vehicular micro cloud 194 over time. This means that the computing resources available within the vehicular micro cloud 194 is variable based on the traffic patterns for the geographic location at different times of day: increased traffic corresponds to increased computing resources because more vehicles will be eligible to join the vehicular micro cloud 194; and decreased traffic corresponds to decreased computing resources because less vehicles will be eligible to join the vehicular micro cloud 194.

In some embodiments, the V2X network is a non-infrastructure network. A non-infrastructure network is any conventional wireless network that does not include infrastructure such as cellular towers, servers, or server farms. For example, the V2X network specifically does not include a mobile data network including third-generation (3G), fourth-generation (4G), fifth-generation (5G), long-term evolution (LTE), Voice-over-LTE (VoLTE) or any other mobile data network that relies on infrastructure such as cellular towers, hardware servers or server farms.

In some embodiments, the non-infrastructure network includes Bluetooth® communication networks for sending and receiving data including via one or more of DSRC, mmWave, full-duplex wireless communication and any other type of wireless communication that does not include infrastructure elements. The non-infrastructure network may include vehicle-to-vehicle communication such as a Wi-Fi™ network shared among two or more vehicles 123, 124.

In some embodiments, the wireless messages described herein are encrypted themselves or transmitted via an encrypted communication provided by the network 105. In some embodiments, the network 105 may include an encrypted virtual private network tunnel ("VPN tunnel") that does not include any infrastructure components such as network towers, hardware servers or server farms. In some embodiments, the coordination system 199 includes encryption keys for encrypting wireless messages and decrypting the wireless messages described herein.

The cloud server 103 includes an instance of the coordination system 199. In some embodiments, the coordination system 199 includes code and routines that are operable, when executed by the processor 125, to execute one or more steps of the method 600 described below with reference to FIG. 6 or the method 700 described below with reference to FIG. 7.

In some embodiments, the cloud server 103 is a conventional hardware server that is improved by inclusion and execution of the coordination system 199. In some embodiments, the cloud server 103 is one or more of the following: a hardware server; a personal computer; a laptop; a device such as a roadside unit which is not a member of the vehicular micro cloud 194; or any other processor-based connected device that is not a member of the vehicular micro cloud 194 and includes an instance of the coordination system 199 and a non-transitory memory that stores some or all of the digital data that is stored by the memory 127 of the ego vehicle 123 or otherwise described herein.

Figure 2:
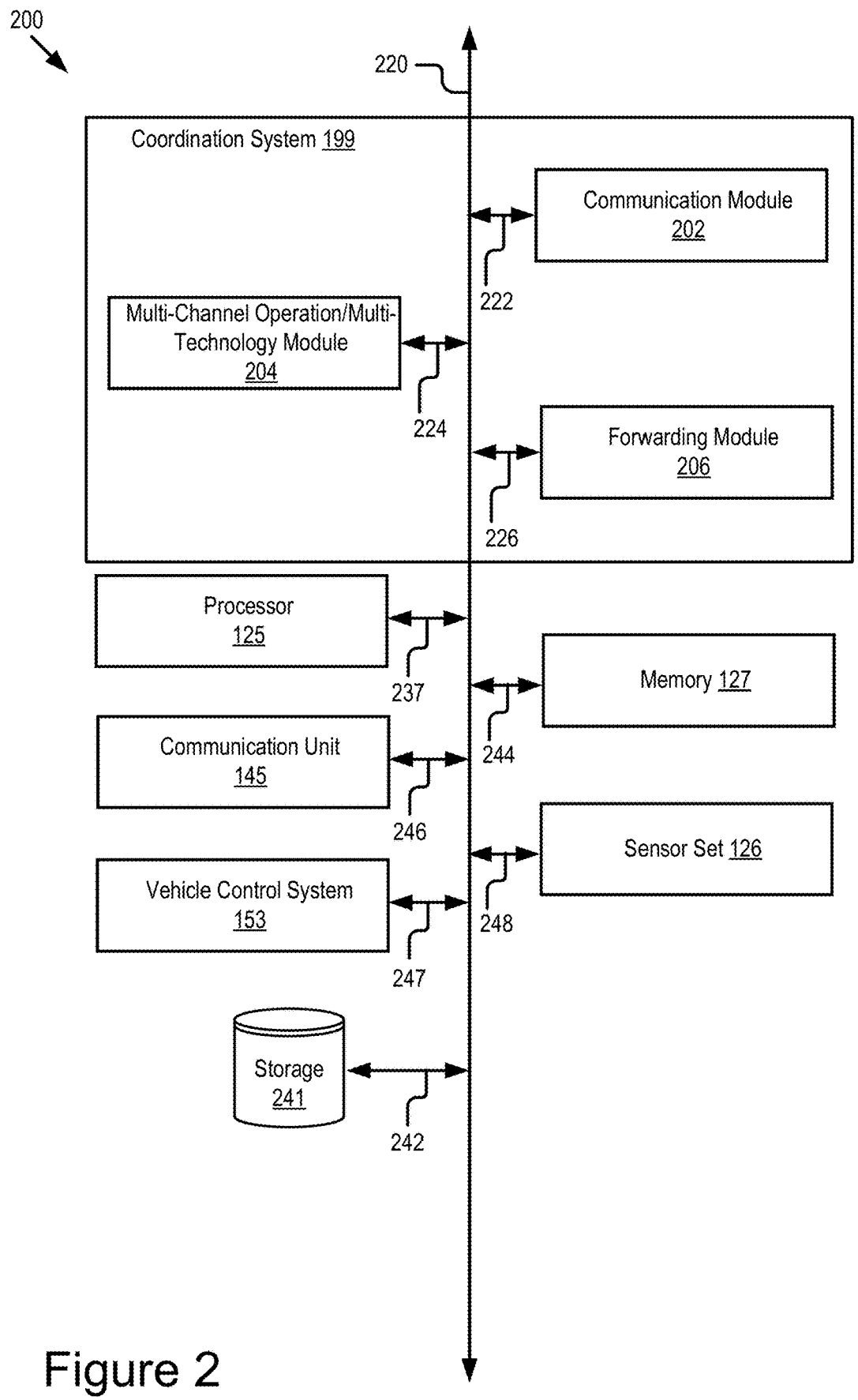
FIG. 2 is a block diagram illustrating an example computer system including a coordination system according to some embodiments.

Referring now to FIG. 2, depicted is a block diagram illustrating an example computer system 200 including a coordination system 199 according to some embodiments.

In some embodiments, the computer system 200 may include a special-purpose computer system that is programmed to perform one or more steps of one or more of the method 600 described herein with reference to FIG. 6 or the method 700 described herein with reference to FIG. 7.

In some embodiments, the computer system 200 may include a processor-based computing device. For example, the computer system 200 may include a processor that is part of the cloud server 103 or the edge server 104, or an onboard vehicle computer system of the ego vehicle 123 or the remote vehicle 124.

The computer system 200 may include one or more of the following elements according to some examples: the coordination system 199; a processor 125; a memory 127; a communication unit 145; a sensor set 126; a vehicle control system 153; and a storage 241. The components of the computer system 200 are communicatively coupled by a bus 220.

In the illustrated embodiment, the processor 125 is communicatively coupled to the bus 220 via a signal line 237. The memory 127 is communicatively coupled to the bus 220 via a signal line 244. The communication unit 145 is communicatively coupled to the bus 220 via a signal line 246. The sensor set 126 is communicatively coupled to the bus 220 via a signal line 248. The vehicle control system 153 is communicatively coupled to the bus 220 via a signal line 247. The storage 241 is communicatively coupled to the bus 220 via a signal line 242.

In some embodiments, the sensor set 126 includes standard-compliant GPS unit. In some embodiments, the communication unit 145 includes a sniffer.

The following elements of the computer system 200 were described above with reference to FIG. 1, and so, these descriptions will not be repeated here: the processor 125; the communication unit 145; the vehicle control system 153; the memory 127; and the sensor set 126.

The storage 241 can be a non-transitory storage medium that stores data for providing the functionality described herein. The storage 241 may be a DRAM device, a SRAM device, flash memory, or some other memory devices. In some embodiments, the storage 241 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In some embodiments, the coordination system 199 includes code and routines that are operable, when executed by the processor 125, to cause the processor 125 to execute one or more steps of the method 600 described herein with reference to FIG. 6 or the method 700 described herein with reference to FIG. 7.

In the illustrated embodiment shown in FIG. 2, the coordination system 199 includes a communication module 202, a multi-channel operation-multi technology module 204, and a forwarding module 206.

The communication module 202 can be software including routines for handling communications between the coordination system 199 and other components of the computer system 200. In some embodiments, the communication module 202 can be a set of instructions executable by the processor 125 to provide the functionality described below for handling communications between the coordination system 199 and other components of the computer system 200. In some embodiments, the communication module 202 can be stored in the memory 127 of the computer system 200 and can be accessible and executable by the processor 125. The communication module 202 may be adapted for cooperation and communication with the processor 125 and other components of the computer system 200 via signal line 222.

The communication module 202 sends and receives data, via the communication unit 145, to and from one or more elements of the operating environment 100. For example, where the coordination system 199 is stored on an ego vehicle 123 and the ego vehicle 123 transmits a communication to a remote vehicle 124 that belongs to the same subgroup, the communication module 202 may transmit the communication to the remote vehicle 124. In some embodiments, the communication module 202 may use subgroup data 197 to determine that the remote vehicle 124 is part of the same subgroup and how to transmit the communication to the remote vehicle 124.

In some embodiments, the communication module 202 may handle communications between components of the coordination system 199 or the computer system 200. For example, the communication module 202 may receive instructions from the multi-channel operation/multi-technology module 204 to be transmitted to the ego vehicle and remote vehicles (depending on whether the computer system 200 is stored in the ego vehicle or a server). The communication module 202 transmits the instructions to the communication unit 145 to transmit to the ego vehicle and/or remote vehicles.

In some embodiments, the communication module 202 receives data from components of the coordination system 199 and stores the data in one or more of the storage 241 and the memory 127. For example, the communication module 202 may store the instructions for dividing the vehicular micro vehicle into subgroups in the storage 241 as subgroup data 197.

The multi-channel operation/multi-technology module 204 can be software including routines for dividing a vehicular micro cloud into subgroups. In some embodiments, the multi-channel operation/multi-technology module 204 can be a set of instructions executable by the processor 125 to provide the functionality described below for dividing the vehicular micro cloud into subgroups. In some embodiments, the multi-channel operation/multi-technology module 204 can be stored in the memory 127 of the computer system 200 and can be accessible and executable by the processor 125. The multi-channel operation/multi-technology module 204 may be adapted for cooperation and communication with the processor 125 and other components of the computer system 200 via signal line 224.

In some embodiments, the multi-channel operation/multi-technology module 204 receives network statistics from one or more vehicles that are members of a vehicular micro cloud. In embodiments where the computer system 200 is an ego vehicle 123 as described in FIG. 1, the network statics may be derived from both network statistics data 192 that describes communications between pairs of remote vehicles and from sensor data 195 generated by the sensor set 126 in the ego vehicle 123. In embodiments where the computer system 200 is part of a server, such as the cloud server 103 or the edge server 104 illustrated in FIG. 1, the multi-channel operation/multi-technology module 204 may derive the network statistics from the network statistics data 192.

The multi-channel operation/multi-technology module 204 may detect a degradation in V2V communication performance based on the network statistics. For example, the degradation may be from channel congestion or latency between the vehicle that transmits a communication and the vehicle that receives the communication. The multi-channel operation/multi-technology module 204 generates a communication graph based on the network statistics. For example, the communication graph may be generated by defining each vehicle in the vehicular micro cloud as a vertex, connecting each pair of the vertices with an edge, and associating each edge with a weight, where the weight indicates an amount of network traffic transmitted between a corresponding pair of vehicles in the vehicular micro cloud.

The multi-channel operation/multi-technology module 204 may divide the vehicular micro cloud into subgroups based on the communication graph. For example, the subgroups may be based on dividing the communication graph into a number of subgroups such that a total weight of edges across the graphs is minimized, where a number of subgroups matches the number of subgroups.

The multi-channel operation/multi-technology module 204 may transmit instructions to the vehicles in the vehicular micro cloud to form the subgroups. The instructions may include assigning a corresponding vehicle to one of the subgroups and a corresponding wireless channel or corresponding wireless communication that is used for communication within the one of the subgroups. This information may be stored as subgroup data 197.

The forwarding module 206 can be software including routines for forwarding communications to vehicles that are in different subgroups. In some embodiments, the forwarding module 206 can be a set of instructions executable by the processor 125 to provide the functionality described below for forwarding communications to vehicles that are in different subgroups. In some embodiments, the forwarding module 206 can be stored in the memory 127 of the computer system 200 and can be accessible and executable by the processor 125. The forwarding module 206 may be adapted for cooperation and communication with the processor 125 and other components of the computer system 200 via signal line 226.

In embodiments where the ego vehicle 123 stores the coordination system 199, the forwarding module 206 may receive the communication from the communication module 202 for forwarding to a remote vehicle 124. The forwarding module 206 may determine, based on subgroup data 197, how to communication with the remote vehicle 124. For example, the ego vehicle 123 may communicate with remote vehicles 124 within the same subgroup using BSMs, but a remote vehicle 124 in a different subgroup may use Wi-Fi for communication. As a result, the ego vehicle 123 may forward the communication to the remote vehicle 124 using Wi-Fi.

In embodiments where a server (e.g., the cloud server 103 or the edge server 104) stores the coordination system 199, the forwarding module 206 may receive a communication from a first vehicle (e.g., an ego vehicle 123) that is intended for a second vehicle (e.g., a remote vehicle 124) associated with a different subgroup. The forwarding module 206 may determine, based on subgroup data 197, how to communication with the remote vehicle 124. For example, the forwarding module 206 may determine that the first vehicle communicates using a first wireless channel and the second vehicle communicates using a second wireless channel. The forwarding module 206 forwards the communication to the second vehicle, for example, by using the second wireless channel. This forwarding process may be referred to as vehicle-to-cloud-to-vehicle (V2C2V) communication.

FIG. 3 is a block diagram 300 illustrating a communication graph 305 and how the communication graph 305 is used to determine the subgroups for the vehicular micro cloud according to some embodiments. The coordination system 199 generates a communication graph 305 where each vehicle in the vehicular micro cloud is assigned a vertex and all pairs of vertices are connected by edges. Thus, in this example, there are four vehicles in the vehicular micro cloud (A, B, C, and D) and eight edges. Each edge is associated with a weight, which indicates the amount of network traffic transmitted between the corresponding pair of micro cloud members. In this example, the average amount of data transferred between vehicles A and B, and vehicles C and D, and accordingly, the edges between those vertices is 1 MB/s. The average amount of data transferred between vehicles A and D, A and C, B and C, and B and D, and accordingly, the edges between those vertices is 0.1 MB/s.

The coordination system 199 minimizes cellular communication overhead and communication latency by generating subgroups that minimize data traffic across the subgroups. Rectangles 310 and 315 represent the subgroups that are generated to maintain data traffic among the A and B vehicles, and the C and D vehicles, which each have average traffic of 1.0 MB/s. The total weight of edges across the boundary of subgroups is 0.4 MB/s, which means that 0.4 MB/s of data traffic are sent by using the coordination system 199 to forward the communications. The coordination system 199 may further divide a subgroup into multiple pieces if the wireless channel allocated to the subgroup is saturated.

Figure 4A:
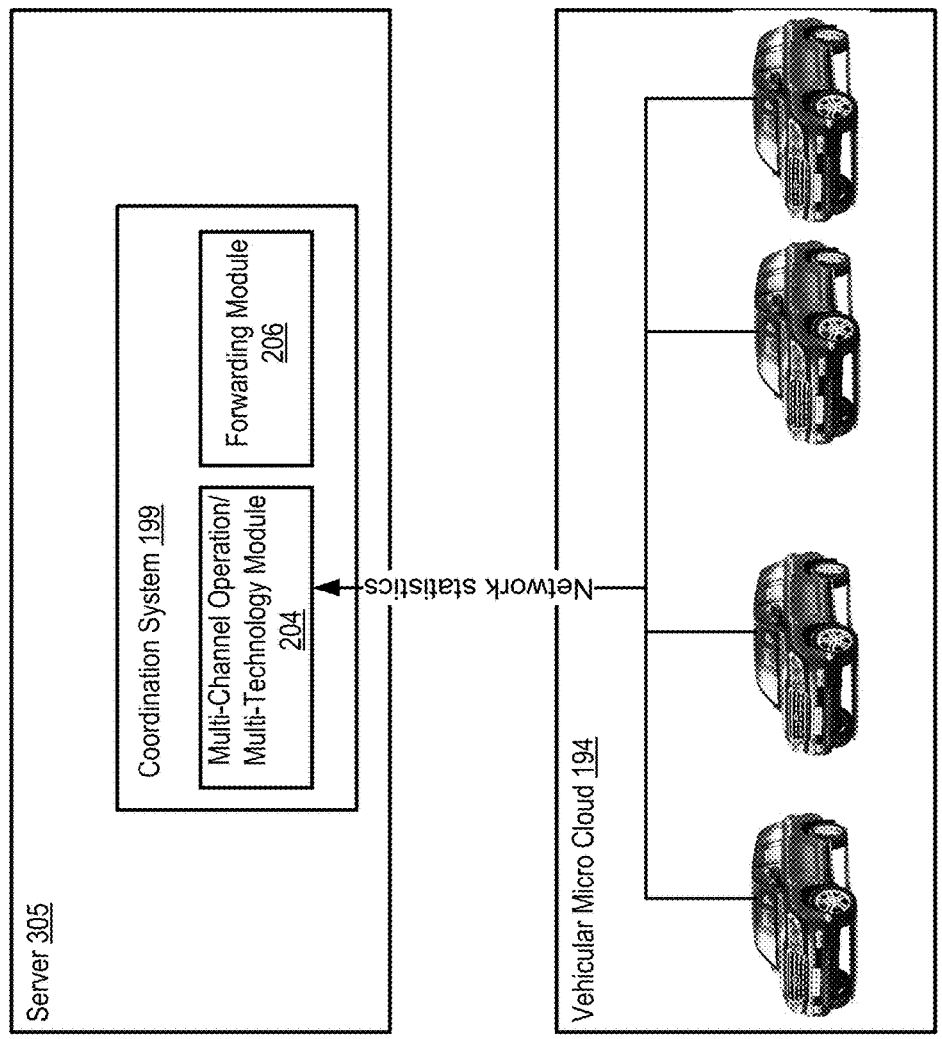
FIG. 4*a* is a block diagram of an example vehicular micro cloud according to some embodiments.
Figure 4B:
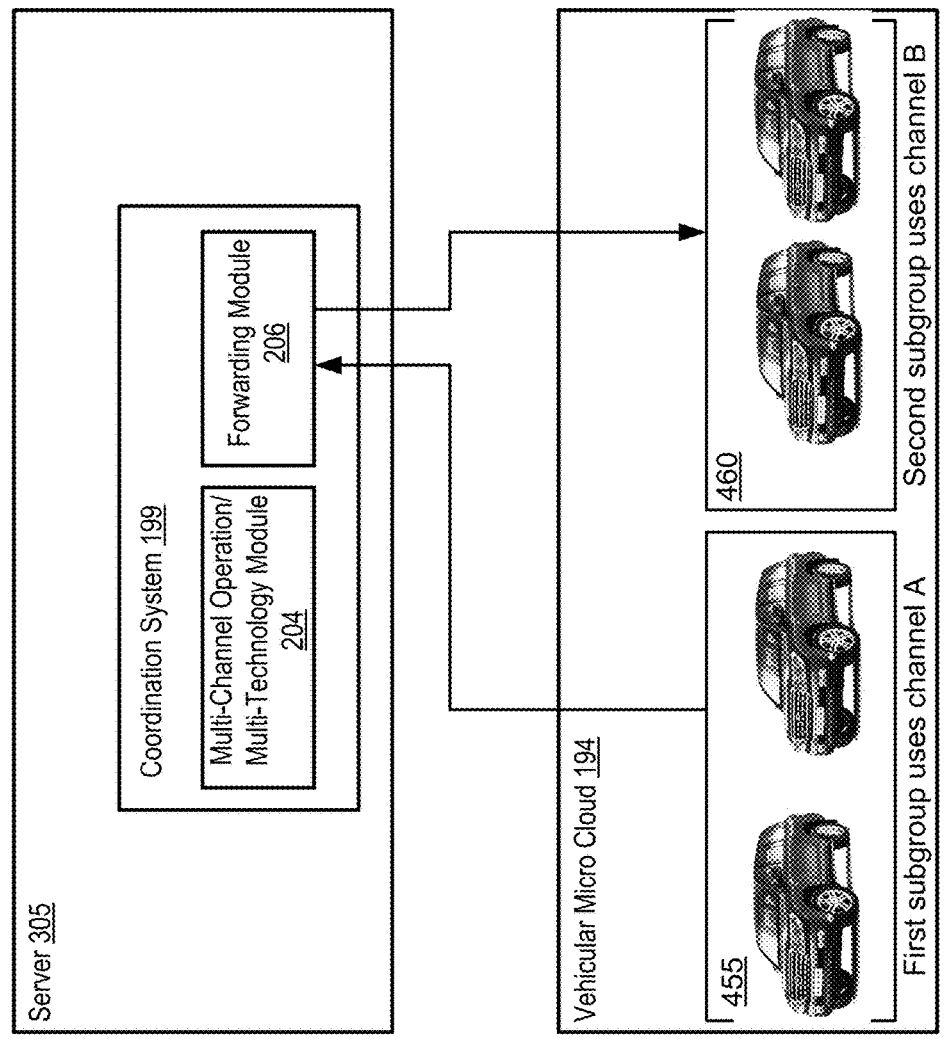
FIG. 4*b* is a block diagram of an example vehicular micro cloud organized into subgroups according to some embodiments.

FIG. 4a is a block diagram 400 of an example vehicular micro cloud according to some embodiments. In this example, the coordination system 199 is stored on a server, such as the cloud server 103 or the edge server 104 illustrated in FIG. 1. The coordination system 199 includes the multi-channel operation/multi-technology module 204 and the forwarding module 206 that are illustrated in FIG. 2. The vehicles in the vehicular micro cloud 194 transmit their network statistics to the multi-channel operation/multi-technology module 204.

Turning to FIG. 4b, a block diagram 450 of an example vehicular micro cloud organized into subgroups is illustrated according to some embodiments. In this example, the vehicular micro cloud 194 is divided into two subgroups: a first subgroup 455 that uses channel A for communications and a second subgroup 460 that uses channel B for communications. When a vehicle that is in the first subgroup 455 wants to communicate with a vehicle that is in the second subgroup 460, the vehicle in the first subgroup 455 cannot directly communicate with the vehicle in the second subgroup 460 because the vehicles operate in different wireless channels. The forwarding module 206 receives the communication and forwards the communication using cellular networks.

Figure 5:
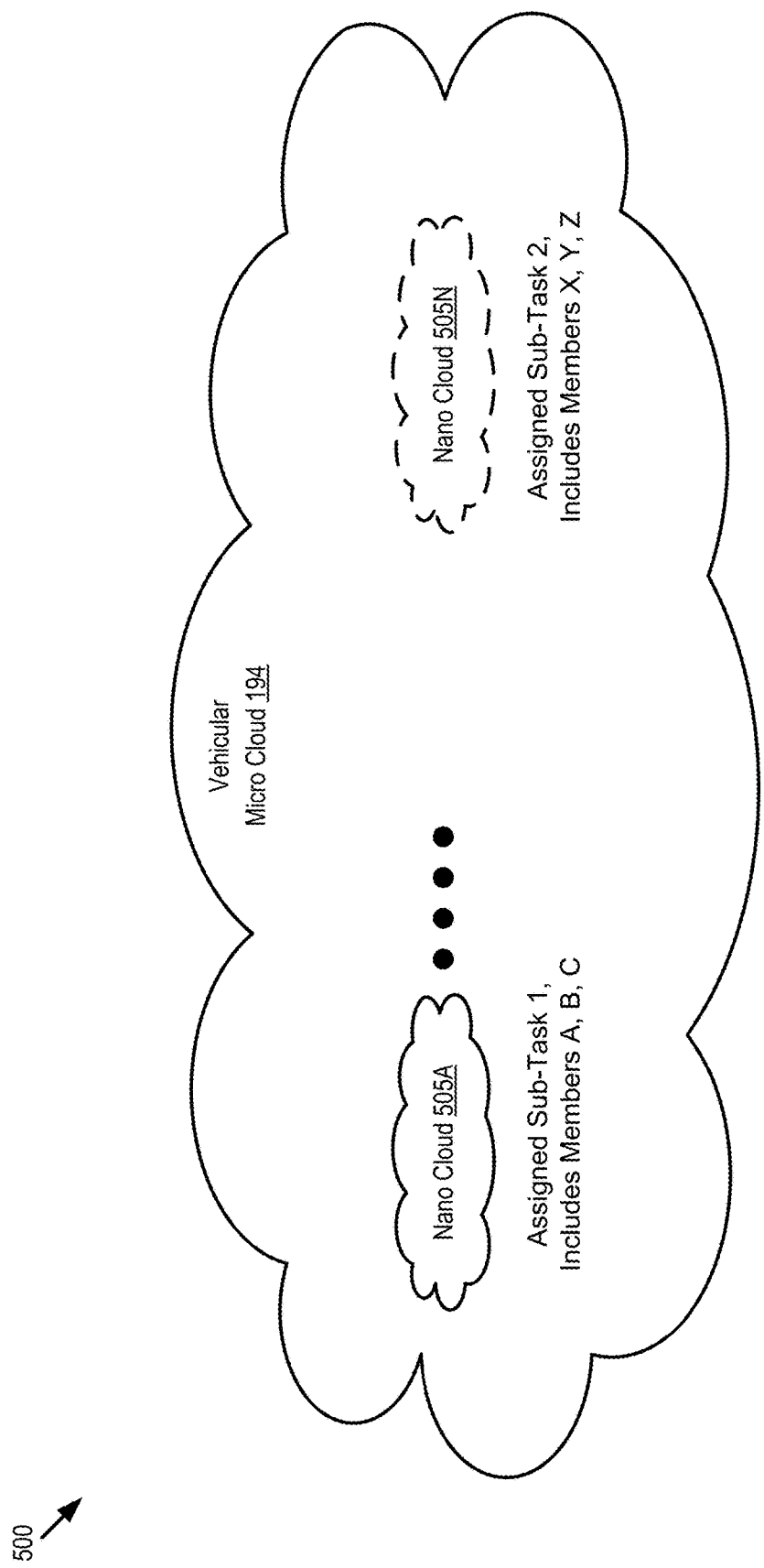
FIG. 5 is a block diagram of an example vehicular micro cloud organized into nano clouds according to some embodiments.

FIG. 5 is a block diagram 500 of an example vehicular micro cloud organized into nano clouds according to some embodiments. The example vehicular micro cloud 194 is organized into a set of nano clouds 505A . . . 505N at a first time according to some embodiments. As depicted, the first nano cloud 505A is assigned sub-task 1. The first nano cloud 505A includes members A, B, and C (e.g., an example of a membership roster for a nano cloud). The Nth nano cloud 505N is assigned sub-task 2. The Nth nano cloud 505N includes members X, Y, and Z. Although the vehicular micro cloud 194 is divided into multiple subgroups that take the form of nano clouds 505 in this example, the sub-tasks may all be organized to serve the functions of the vehicular micro cloud.

FIG. 6 is a flowchart of an example method 600 for dividing a vehicular micro cloud into subgroups by a coordination system according to some embodiments. The method 600 includes step 605, step 610, step 615, and step 620 as depicted in FIG. 6. The steps of the method 600 may be executed in any order, and not necessarily those depicted in FIG. 6. In some embodiments, one or more of the steps are skipped or modified in ways that are described herein or known or otherwise determinable by those having ordinary skill in the art of vehicular micro clouds.

At block 605, network statistics are received from one or more vehicles that are members of a vehicular micro cloud. Block 605 may be followed by block 610. At block 610, a degradation in V2V communication performance based on the network statistics. Block 610 may be followed by block 615. At block 615, a communication graph is generated based on the network statistics. Block 615 may be followed by block 620. At block 620, the vehicular micro cloud is divided into subgroups based on the communication graph.

FIG. 7 is a flowchart of an example method 700 for instructing vehicles in a vehicular micro cloud to form subgroups according to some embodiments. The method 700 includes step 705, step 710, step 715, and step 720 as depicted in FIG. 7. The steps of the method 700 may be executed in any order, and not necessarily those depicted in FIG. 7. In some embodiments, one or more of the steps are skipped or modified in ways that are described herein or known or otherwise determinable by those having ordinary skill in the art of vehicular micro clouds.

At block 705, network statistics are received from one or more vehicles that are members of a vehicular micro cloud. Block 705 may be followed by block 710. At block 710, a degradation in V2V communication performance based on the network statistics. Block 710 may be followed by block 715. At block 715, a communication graph is generated based on the network statistics by: defining each vehicle in the vehicular micro cloud as a vertex (e.g., to form a set of vertices), connecting each of the vertices with an edge, associating each edge with a weight, and generating the communication graph by minimizing a total weight of edges across different subgroups. Block 715 may be followed by block 720. At block 720, the vehicular micro cloud is divided into subgroups based on the communication graph. Block 720 may be followed by block 725. At block 725, instructs are transmitted to vehicles in the vehicular micro cloud to form the subgroups.

Example differences in technical effect between the method 600 or the method 700 and the prior art are described below. These examples are illustrative and not exhaustive of the possible differences.

Existing solutions fail to address the problems of channel congestion or latency. In some embodiments, a first difference in technical effect that the existing solutions do not include is a coordination system that solves these problems by forming subgroups that minimize data traffic across subgroups. A second difference in technical effect is that the existing solutions do not address additional changes in the network statistics that could cause different types of channel congestion or latency. In some embodiments, the coordination system solves these problems by reassigning vehicles to different subgroups or additional divides a subgroup into additional subgroups.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present embodiments can be described above primarily with reference to user interfaces and particular hardware. However, the present embodiments can apply to any type of computer system that can receive data and commands, and any peripheral devices providing services.

Reference in the specification to "some embodiments" or "some instances" means that a particular feature, structure, or characteristic described in connection with the embodiments or instances can be included in at least one embodiment of the description. The appearances of the phrase "in some embodiments" in various places in the specification are not necessarily all referring to the same embodiments.

Some portions of the detailed descriptions that follow are presented in terms of algorithms and symbolic representations of operations on data bits within a computer memory. These algorithmic descriptions and representations are the means used by those skilled in the data processing arts to convey the substance of their work most effectively to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present embodiments of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some preferred embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited, to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A method implemented by a server, the method comprising:
   receiving network statistics from one or more vehicles that are members of a vehicular micro cloud, wherein at least one member of the vehicular micro cloud is required to share their unused computing resources with the other members of the vehicular micro cloud;
   detecting a degradation in vehicle-to-vehicle (V2V) communication performance based on the network statistics;
   generating a communication graph based on the network statistics including defining at least two vehicles in the vehicular micro cloud as a vertex to form a set of vertices, connecting at least two of the vertices with an edge, and associating the edge with a weight; and
   dividing the vehicular micro cloud into subgroups based on the communication graph so that the communication graph is divided into a number of subgraphs such that a total weight of the edge is reduced and communications between different subgroups are manageable independent of one another.

2. The method of claim 1, wherein generating the communication graph includes:
   defining each vehicle in the vehicular micro cloud as a vertex to form a set of vertices;

connecting each pair of the vertices with an edge; and
associating each edge with a weight, wherein the weight indicates an amount of network traffic transmitted between a corresponding pair of vehicles in the vehicular micro cloud.

3. The method of claim 2, wherein dividing the vehicular micro cloud into subgroups based on the communication graph includes dividing the communication graph into a number of subgraphs such that a total weight of edges across the subgraphs is minimized, wherein a number of subgroups matches the number of subgraphs.

4. The method of claim 1, wherein a first subgroup of the subgroups uses one or more of a different wireless channel or a different wireless communication technology than a second subgroup and further comprising:
receiving a communication from a first vehicle associated with the first subgroup that is intended for a second vehicle associated with the second subgroup; and
forwarding the communication to the second vehicle.

5. The method of claim 4, wherein the communication is forwarded using a vehicle to cloud to vehicle communication (V2C2V).

6. The method of claim 4, further comprising responsive to communications between the first vehicle and the second vehicle meeting a threshold communication value, reassigning corresponding vehicles in the subgroups.

7. The method of claim 4, further comprising responsive to a wireless channel associated with the first subgroup becoming saturated, dividing the first subgroup into a third subgroup and a fourth subgroup.

8. The method of claim 1, further comprising transmitting instructions to the vehicles in the vehicular micro cloud to form the subgroups, wherein the instructions include assigning a corresponding vehicle to one of the subgroups and a corresponding wireless channel or corresponding wireless communication that is used for communication within the one of the subgroups.

9. The method of claim 1, wherein the network statistics include an amount of data transmitted between each pair of vehicles in the vehicular micro cloud and the network statistics are received periodically from the one or more vehicles in the subgroups, the method further comprising:
updating the communication graph based on more recent network statistics;
determining that an amount of communications between a first vehicle in a first subgroup and a second vehicle in a second subgroup meet a threshold communication value; and
responsive to meeting the threshold communication value, reassigning corresponding vehicles in the subgroups.

10. The method of claim 1, wherein the network statistics include a network condition.

11. The method of claim 1, wherein the degradation is for one or more of channel congestion or latency.

12. A computer-program product included in at least one onboard vehicle computer of an ego vehicle, the computer program product stored in non-transitory computer readable medium that is operable, when executed by the onboard vehicle computer, to cause the onboard vehicle computer to execute steps including:
transmitting, to a server, network statistics that describe communications between the ego vehicle and one or more remote vehicles, wherein the ego vehicle and the one or more remote vehicles are members of a vehicular micro cloud, wherein at least one member of the vehicular micro cloud is required to share their unused computing resources with the other members of the vehicular micro cloud; and
receiving an instruction from the server for the ego vehicle to be associated with a first group, wherein the server detects a degradation in vehicle-to-vehicle (V2V) communication performance based on the network statistics;
generating a communication graph including defining at least two vehicles in the vehicular micro cloud as a vertex to form a set of vertices, connecting at least two of the vertices with an edge, and associating the edge with a weight; and
dividing the vehicular micro cloud into subgroups based on the communication graph so that the communication graph is divided into a number of subgraphs such that a total weight of the edge is reduced and communications between different subgroups are manageable independent of one another.

13. The computer-program product of claim 12, wherein the first subgroup uses one or more of a first wireless channel or a first wireless communication technology and wherein the first wireless channel or the first wireless communication technology is different from one or more of a second wireless channel or a second wireless communication technology used by the second subgroup.

14. The computer-program product of claim 13, wherein the non-transitory computer code is further operable to execute steps including:
generating a communication for a remote vehicle of the one or more remote vehicles;
determining that the remote vehicle is associated with the second subgroup; and
transmitting the communication to the server, wherein the server forwards the communication to the remote vehicle.

15. The computer-program product of claim 13, wherein the non-transitory computer code is further operable to execute steps including:
generating a communication for a remote vehicle;
determining that the remote vehicle is associate with the first subgroup; and
transmitting the communication to the remote vehicle uses one or more of the first wireless channel or the first wireless communication technology.

16. A method implemented by an ego vehicle, the method comprising:
receiving network statistics from one or more vehicles that are members of a vehicular micro cloud, wherein at least one member of the vehicular micro cloud is required to share their unused computing resources with the other members of the vehicular micro cloud;
detecting a degradation in vehicle-to-vehicle (V2V) communication performance based on the network statistics;
generating a communication graph based on the network statistics including defining at least two vehicles in the vehicular micro cloud as a vertex to form a set of vertices, connecting at least two of the vertices with an edge, and associating the edge with a weight; and
dividing the vehicular micro cloud into subgroups based on the communication graph so that the communication graph is divided into a number of subgraphs such that a total weight of the edge is reduced and communications between different subgroups are manageable independent of one another.

17. The method of claim 16, wherein generating the communication graph includes:

defining each vehicle in the vehicular micro cloud as a vertex to form a set of vertices;

connecting each pair of the vertices with an edge; and associating each edge with a weight, wherein the weight indicates an amount of network traffic transmitted between a corresponding pair of vehicles in the vehicular micro cloud.

18. The method of claim 17, wherein dividing the vehicular micro cloud into subgroups based on the communication graph includes dividing the communication graph into a number of subgraphs such that a total weight of edges across the subgraphs is minimized, wherein a number of subgroups matches the number of subgraphs.

19. The method of claim 16, wherein the ego vehicle is associated with a first subgroup of the subgroups that uses one or more of a different wireless channel or a different wireless communication technology than a second subgroup and further comprising:

generating a communication that is intended for a remote vehicle associated with a second subgroup; and forwarding the communication to the remote vehicle.

20. The method of claim 19, further comprising responsive to communications between the ego vehicle and the remote vehicle meeting a threshold communication value, reassigning corresponding vehicles in the subgroups.

* * * * *